(12) United States Patent
Shimizu et al.

(10) Patent No.: US 6,671,386 B1
(45) Date of Patent: Dec. 30, 2003

(54) GEOMETRICAL TRANSFORMATION IDENTIFYING SYSTEM

(75) Inventors: Shuichi Shimizu, Yokohama (JP); Akioi Koido, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/316,525

(22) Filed: May 21, 1999

(30) Foreign Application Priority Data

May 22, 1998 (JP) .......................................... 10-140726

(51) Int. Cl.[7] .............................................. G06K 9/00
(52) U.S. Cl. ..................... 382/100; 382/296; 382/298; 235/382; 713/176
(58) Field of Search ............................... 382/137, 232, 382/274, 250, 280, 115, 100, 298, 279, 199, 266, 269, 296; 235/382; 380/3, 4, 54, 59, 51, 55; 399/366, 84; 355/201; 713/176

(56) References Cited

U.S. PATENT DOCUMENTS

| 5,530,759 A | * | 6/1996 | Braudaway et al. ......... 382/137 |
| 5,642,293 A | * | 6/1997 | Manthey et al. ............ 382/285 |
| 5,644,656 A | * | 7/1997 | Akra et al. ................. 382/215 |
| 5,784,490 A | * | 7/1998 | Akra et al. ................. 382/215 |
| 5,825,892 A |   | 10/1998 | Braudaway et al. .......... 380/51 |
| 5,859,920 A | * | 1/1999 | Daly et al. .................. 382/115 |
| 5,949,055 A | * | 9/1999 | Fleet et al. .................. 235/469 |
| 6,044,156 A | * | 3/2000 | Honsinger et al. ............ 380/54 |
| 6,057,922 A | * | 5/2000 | Hayden ........................ 356/457 |

OTHER PUBLICATIONS

U.S. patent application Ser. No. 60/117,921, filed Jan. 29, 1999.

* cited by examiner

Primary Examiner—Jayanti K. Patel
Assistant Examiner—Sheela Chawan
(74) Attorney, Agent, or Firm—Louis P. Herzberg; Anne V. Dougherty

(57) ABSTRACT

A geometrical correction system and method comprising creation of at least one pattern consisting of asymmetric two dimensional waves, embedding at least one pattern consisting of asymmetric two dimensional waves in a real domain, and calculation of at least one geometrical transformation applied by way of extraction of the embedded two dimensional waves. Said creation of at least one pattern consisting of asymmetric two dimensional waves means to calculate a two dimensional wave parameter set for creating at least one pattern adapted for use in the geometrical correction system of this invention. Also, said embedding of at least one pattern consisting of asymmetric two dimensional waves in a real domain means to add the pattern to an original image. Further, said calculation of at least one geometrical transformation applied by way of extraction of the embedded two dimensional waves means to calculate parameters of the embedded two dimensional waves from the image that is subjected to at least one geometrical transformation, to compare these parameters with the two dimensional wave parameter set of the embedded pattern, thereby to identify the geometrical transformation applied to the embedded image.

21 Claims, 16 Drawing Sheets

GEOMETRICAL TRANSFORMATION IDENTIFYING SYSTEM

FIELD OF THE INVENTION

This invention relates to a method and a system for accurately identifying at least one geometrical transformation applied to an image that has two dimensional waves embedded therein, whenever such an image has been subjected to the geometrically transformation.

BACKGROUND OF THE INVENTION

It is already known in the art that rotation of a space causes distribution of a frequency domain (Fourier Transformed Space) to be rotated as well. While E. De Castro and C. Morandi (IEEE Trans. Pattern Analysis and Machine Intelligence, Vol. PAMI-9, No. 5, pp. 700–703, 1987) apply this principle to geometrical correction (geometrical registration) of a rotated image, nevertheless they do not propose or suggest intentionally embedding two dimensional waves. Rather, they use a method of repetitively searching for a rotational angle that will maximize a correlation in a frequency domain between an original image and a rotated image. Thus, this method inevitably requires use of an original image for the purpose of determining any linear transformations applied thereto.

U.S. Pat. No. 5,636,292, entitled "Steganography Methods Employing Embedded Calibration Data", discloses a digital watermarking method for embedding a multi-bit identifying function in a two dimensional pattern itself. In this patented invention, information signals, to be embedded as digital watermarks, and other information signals, to be used for discerning any deformation applied to an image, are integrated together; and, in the case of embedding a pattern consisting of a plurality of two dimensional waves, the embedding pattern is rendered to have at least one axis of symmetry. However, with such symmetry, a linear transformation at the time of pattern extraction has a plurality of solutions and, thus, there is no way to completely identify the geometrical transformation. Further, this patented invention uses a method steps of: transforming an image that has a two dimensional wave pattern embedded therein to another space (frequency domain); filtering; and, returning the same to a real domain again. However, in accordance with such a method, it is difficult to control invisibility and/or degradation of image quality. Digital watermarks embedded in an image for copyright protection require countermeasures against any manipulations for removing them. Such manipulations for removing digital watermarks include geometrical transformations such as clipping, rotation, scaling, anisotropic scaling, and the like. However, to the best of our knowledge, the prior art fails to provide a single means for rapidly and accurately identifying geometrical transformations applied to an image, which contains these digital watermarks therein, and correcting the same.

Moreover, where a manufacturing process requires accurate position control of a manufacture piece, the prior art fails to provide any means for allowing additional position control to be performed whenever the manufacture piece is geometrically deformed due to any changes in an external environment.

Accordingly, it is an object of this invention to provide a method and system that are capable of easily and rapidly identifying at least one geometrical transformation applied to an image in a accurate manner without using its original image.

Also, it is another object of this invention to provide a method and system for embedding two dimensional waves in an image, thereby to easily control invisibility and/or degradation of image quality.

Also, it is another object of this invention to provide a method and system that are capable of accurately and rapidly identifying at least one geometrical transformation applied to an image that contains digital watermarks therein.

Also, it is another object of this invention to provide a method and system that are capable of accurately and rapidly detecting at least one geometrical transformation applied to an original image even where a digital watermarking image is subjected to clipping, rotation, scaling, anisotropic scaling, or the like.

Further, it is yet another object of this invention to provide a method and system for reading at least one geometrical transformation applied to a manufacture piece, which requires accurate position control, and performing appropriate position control of the manufacture piece.

SUMMARY OF THE INVENTION

These and other objects are realized by the a geometrical correction system of this invention which comprises creation of at least one pattern consisting of asymmetric two dimensional waves, embedding at least one pattern consisting of asymmetric two dimensional waves in a real domain, and calculation of at least one geometrical transformation applied by way of extraction of the embedded two dimensional waves. Firstly, said creation of At least one pattern consisting of asymmetric two dimensional waves means to calculate a two dimensional wave parameter set for creating at least one pattern adapted for use in the geometrical correction system of this invention. Secondly, said embedding of at least one pattern consisting of asymmetric two dimensional waves in a real domain means to add the pattern to an original image. Finally, said calculation of at least one geometrical transformation applied by way of extraction of the embedded two dimensional waves means to calculate parameters of the embedded two dimensional waves from the image that is subjected to at least one geometrical transformation, to compare these parameters with the two dimensional wave parameter set of the embedded pattern, thereby to identify the geometrical transformation applied to the embedded image.

Also, this invention comprises a digital watermarking system that makes use of the foregoing method and system in a way to improve robustness to a geometrical transformation. More particularly, this invention comprises a method and a system for intentionally embedding a number of two dimensional waves in an image, whereby at least one geometrical transformation applied to the image may be rapidly and accurately identified through calculations of such information about how magnitudes of periods and directions of the embedded two dimensional waves have been transformed. According to this invention, this is accomplished without requiring use of an original image that is free of the embedded two dimensional waves.

BRIEF DESCRIPTION OF THE DRAWINGS

The invention will now be described in greater detail with specific reference to the appended drawings wherein.

DESCRIPTION OF THE PREFERRED EMBODIMENT

Figure 1:
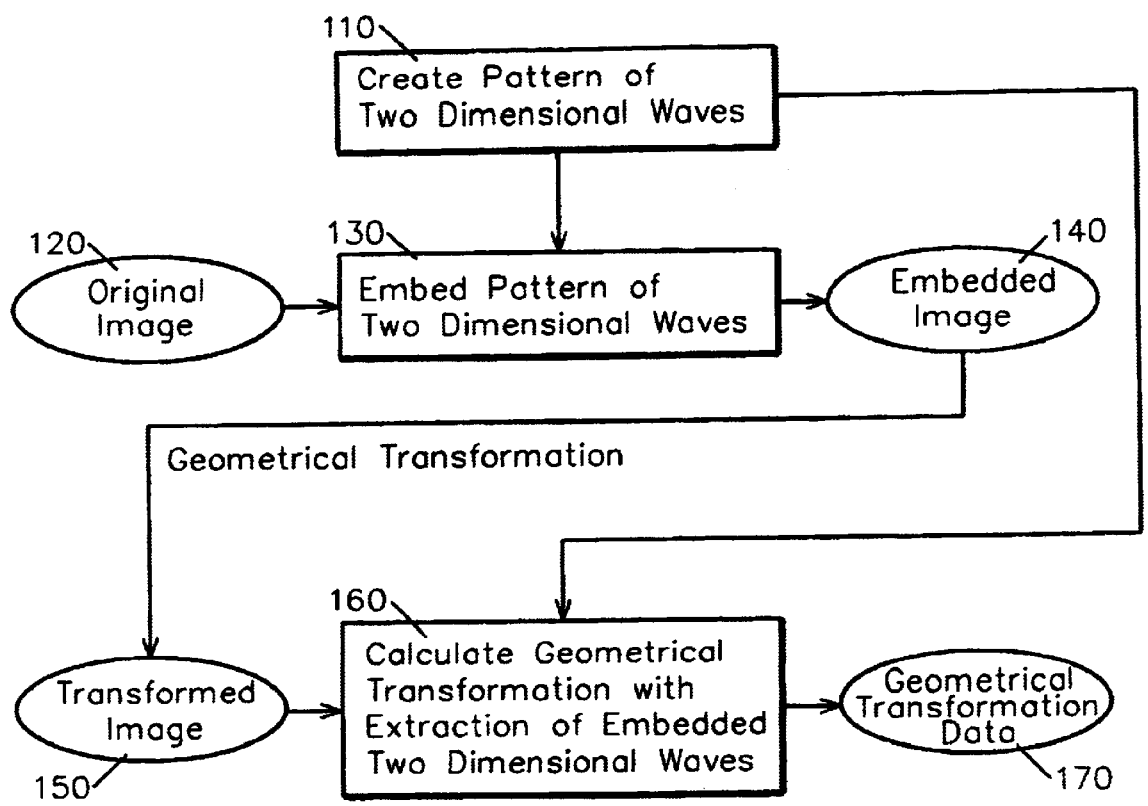
FIG. 1 is a diagram of a geometrical correction system in accordance with embedding of a two dimensional wave pattern.

FIG. 1 shows a block diagram of the geometrical correction system in accordance with this invention. At step 130, asymmetric two dimensional waves, which are created and stored at step 110, are embedded in an original image 120 in a real domain. When an embedded image 140 created in such a manner is geometrically transformed due to some factors, it turns into a transformed image 150. Note here that such factors introduce artificially initiated geometrical transformations, geometrical transformations mechanically initiated by a scanner or a FAX machine, and the like. At block 160, after two dimensional waves embedded in the image are extracted, they are compared with predetermined two dimensional waves, and based on a result of this comparison, the system calculates at least one linear coordinate transformation, including a scaling factor, a rotational angle, an inversion, an anisotropic scaling factor, and/or a parallel translation's amount, which has been applied to the image. The foregoing process up to this point is sufficient for identifying the geometrical transformation which had been applied to the image. In order to additionally perform geometrical correction, however, the identified geometrical transformation is further used for performing geometrical correction (inverse transformation), thereby to create geometrical transformation data 170.

A method of intentionally embedding and extracting asymmetric two dimensional waves makes it possible to easily and rapidly identify at least one geometrical transformation which had been applied to an image in a accurate manner without using its original image. Also, since such embedding is performed in a real domain, it becomes easier to control invisibility and/or degradation of image quality. Further, since this method functions independently of digital watermarking, it becomes possible to accurately and rapidly detect at least one geometrical transformation which had been applied to an original image even where the image that contains digital watermarks therein is subjected to clipping, rotation, scaling, anisotropic scaling, and the like.

Basic Principles

Letting a coordinate of an image be u=(x, y), a pattern consisting of a number of two dimensional waves is defined by the following equation.

$$P(u)=\Sigma_m r_m \exp(2\pi i(w_m^T u+q_m)) \tag{1}$$

Here, x and y of each pixel point are assumed to be on integer values. Also, $w_m=(w_{xm}, w_{ym})$ stands for a frequency vector of a two dimensional wave, $r_m$ for amplitude of a two dimensional wave, $q_m$ for its phase, i for an imaginary unit, and T for an operator for creating a transposed vector and a transposed matrix. If there is no transposition operator T, an associated vector is treated as a column vector. Otherwise, it is treated as a row vector. Therefore, in accordance with the definition of the transposition operator T, $w_m^T u$ stands for an inner product $w_m^T u = w_{xm} x + w_{ym} y$. Since a pixel value is a real number, an embedded pattern must be a real number. This means that there must be a backward wave. For convenience, letting −m be a backward wave with respect to m, the following relation is met.

$$w_{-m}=-w_m, r_{-m}=r_m, q_{-m}=q_m \tag{2}$$

Thus, equation (1) may be rewritten as follows:

$$P(u)=\Sigma r_m \cos(2p(w_m^T u+q_m)) \tag{3}$$

A linear transformation of the point u is expressed as follows:

$$u'=Au+b \tag{4}$$

Here, applying a geometrical transformation to an image I(u) for moving it to the point u', a pixel value I'(u') at this new pixel point u' is given by the following equation.

$$I'(u')=I(A^{-1}(u'-b))=I(u) \tag{5}$$

Thus, an embedded pattern P'(u) in the transformed image is expressed as follows:

$$P'(u')=P(A^{-1}(u'-b)) \tag{6}$$

Here, let B be defined as follows:

$$B=(A^{-1})^T \tag{7}$$

Substituting equation (1) for P in equation (6), and getting a sum by using $w'_m=Bw_m$ in place of the original two dimensional wave number $w_m$, the following relation is met in the transformed image.

$$r'_m = r(w_m), \quad q'_m = q_m - (Bw_m)^T b \tag{8}$$

That is, even in the transformed image, the embedded pattern still consists of a set of two dimensional waves. Therefore, letting a frequency vector of a two dimensional wave in the embedded pattern be $w_m$, and letting a frequency vector of a two dimensional wave in the extracted pattern from the transformed image be $w'_m$, the following relation is met.

$$w'_m = Bw_m \tag{9}$$

Determining the matrix B, it is possible to determine the coordinate transformation A by using the inverse transformation of equation (7). This is the basic principle, part 1 of this invention.

$$A = (B^{-1})^T \tag{10}$$

Note that, as further described below, DFT (Discrete Fourier Transformation) is used for extracting the frequency vector $w'_m$ of an embedded two dimensional wave. This transformation may be expressed as follows:

$$G(k) = \Sigma_u \exp(-2\pi i k_T u/N) P(u) \tag{11}$$

Here, N is a width of a domain where DFT is performed, and u=(x, y) for getting a sum runs on a square domain with edges each comprising N pixel points, as expressed below.

$$x = x_o, x_o+1, x_o+2, \ldots, x_o+N-1$$

$$y = y_o, y_o+1, y_o+2, \ldots, y_o+N-1 \tag{12}$$

Since G(k) becomes a function of a period N with respect to each $k_x$ and $k_y$ of $k=(k_x, k_y)$, it is assumed here, for the sake of explanation, that G(k) will be calculated in a domain of grid points (a set of integer values) including an origin, as expressed below.

$$k_x = -N/2+1, -N/2+2, \ldots 0, 1, 2, \ldots N/2$$

$$k_y = -N/2+1, -N/2+2, \ldots 0, 1, 2, \ldots N/2 \tag{13}$$

In order to see how each two dimensional wave is transformed by DFT, substituting a two dimensional wave $\exp(2\pi i(w^T u))$ for $P(u)$ in equation (11), this results in the following:

$$|G(k)| = |\sin(Np(w_x - k_x/N))/\sin(p(w_x - k_x/N))| \, |\sin(Np(w_y - k_y/N)/\sin(p(w_y - k_y/N))| \tag{14}$$

Equation (14) means that even if each component of a frequency vector $w = (w_x, w_y)$ is not necessarily equal to a quotient of an integer divided by the period N of DFT, it may be detected by the DFT using approximate values of $k_x/N$, $k_y/N$. When the value of k is approximated to Nw, G(k) is maximized with respect to k. When w is on a grid point, i.e., when there exists k that satisfies a relation of k=Nw, the maximum value $G(k)=N^2$ is obtained there, whereas values at other grid points are zeros. The maximum value of G(k) becomes least when w is on a diagonal of grid points, i.e., when there exists k that satisfies a relation of $(k_x+1/2, k_y+1/2)=Nw$. There, the maximum value $G(k)=(1/\sin(p/2N))^2$, approximately $0.4N^2$, is obtained. As the grid points depart therefrom, the maximum value is gradually decreased in proportion to a reciprocal of a difference thereof. Also, in the DFT of equation (11), by using the windowing function, as taught by S. M. Kay and S. L. Marple, Jr. in "Spectrum analysis—a modern perspective", Proc. IEEE, Vol. 69, No. 11, pp. 1380–1419, 1981), (i.e., by inserting weights for correcting peripheral effects into equation (11)), it is possible to make an improvement such that G(k) is significantly attenuated whenever the grid point k departs from the frequency vector Nw. Therefore, even if FFT (Fast Fourier Transformation) is used by taking the width N of DFT as being a power of 2, or rotation and/or scaling is performed as a result of performing DFT, an approximate value of each two dimensional wave of the embedded pattern appears in G(k) as a peak on a grid point. This is the basic principle, part 2 of this invention.

Creation of Embedding Pattern Consisting of Two Dimensional Waves

In case of creating an embedding pattern consisting of two dimensional waves, a two dimensional wave parameter set of the pattern defined by equations (1) and (3) (i.e., a frequency vector $w_m$) is selected and values of amplitude $r_m$ and phase $q_m$ are set up, thereby preventing the pattern from being easily detected by a human eye and yet enabling a program to easily perform extraction of frequency vectors and/or calculations of matrices for geometrical transformations.

Figure 4:
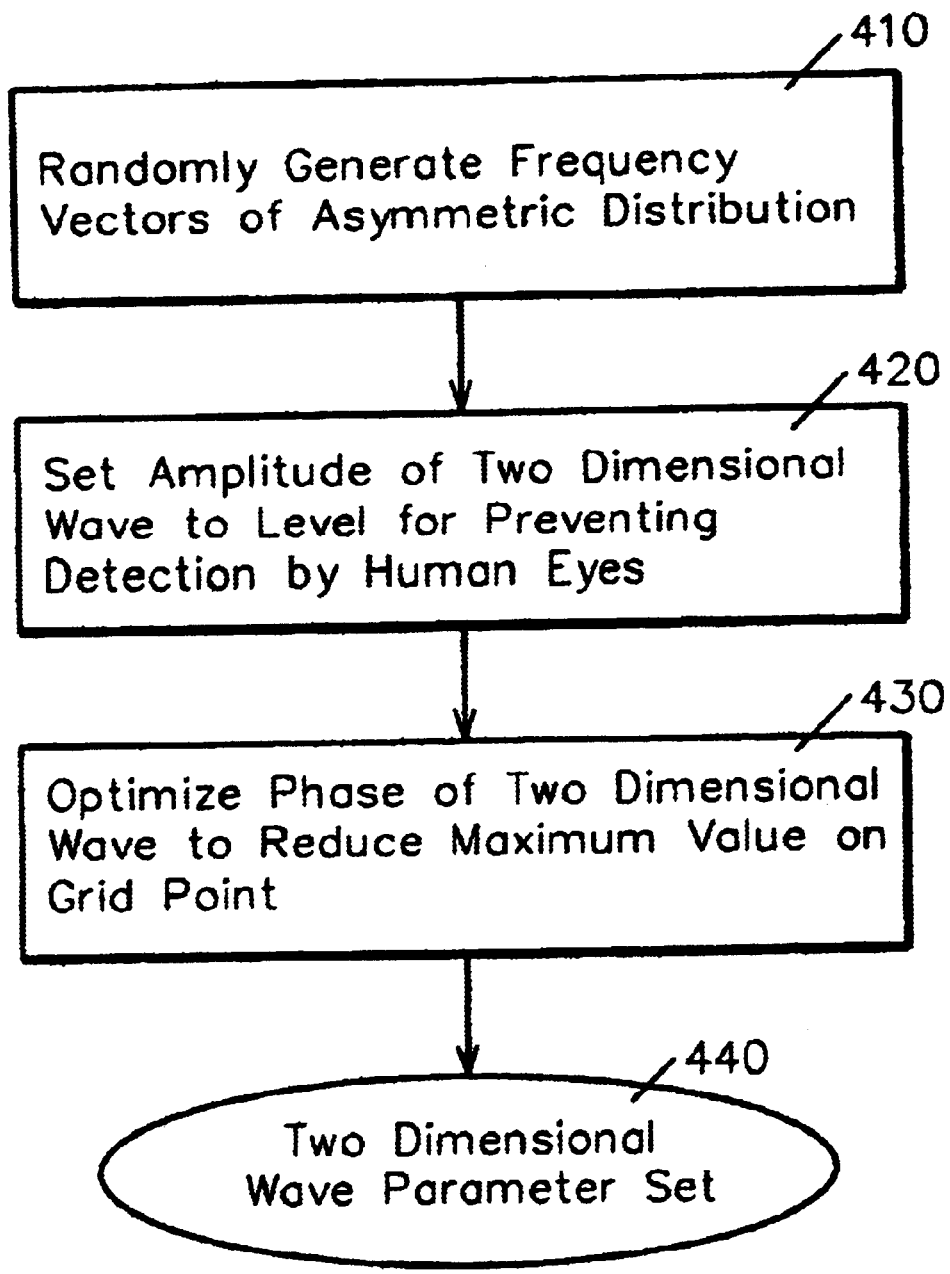
FIG. 4 is a diagram showing creation of a pattern consisting of two dimensional waves.

As shown in FIG. 4, a frequency vector $w_m$ of asymmetric distribution is generated in a pseudo-random manner, amplitude $r_m$ of a two dimensional wave is set to have a magnitude adapted for preventing detection by a human eye, and a phase $q_m$ of the two dimensional wave is optimized so as to reduce the maximum value of absolute values $|P(u)|$ of the embedding pattern on grid points. Automatically performing this procedure on a computer, it is possible to create the embedding pattern in accordance with a key, and to use the embedding pattern consisting of two dimensional waves as an owner identifying mark or a category identifier. Here, when distribution of frequency vectors has symmetry S, it means inevitable existence of m' that satisfies the following equation with respect to an arbitrary frequency vector $w_m$ included in the embedding pattern.

$$w_m' = Sw_m \tag{15}$$

If there exists such symmetry S, and if the matrix B satisfies equation (9), a matrix BS comes to satisfy equation (9) as well by changing a correspondence between an embedded frequency vector and an extracted frequency vector. Because the embedding pattern is a real number, there is no way to avoid the origin symmetry as expressed by equation (2), which necessarily leads to two solutions of matrices B and −B. However, other solutions may be avoided by intentionally breaking the symmetry in distribution of frequency vectors. Such breaking of the symmetry should be established for a subset of the frequency vectors. This is because two dimensional waves may be hidden by a periodic shade in an original image and/or they may be destroyed by image processing other than a geometrical transformation and, hence, frequency vectors of all of the two dimensional waves may not be necessarily extracted from the image. For this reason, it is useful to exploit a technique for creating frequency vector distribution that breaks the symmetry by means of introduction of randomness. This randomness is important for preventing a number of points from being haphazardly aligned on x axis or y axis at the time of rotation. More particularly, such randomized frequency vector distribution may be created as detailed below.

Global Random Distribution Creating Method

Figure 5:
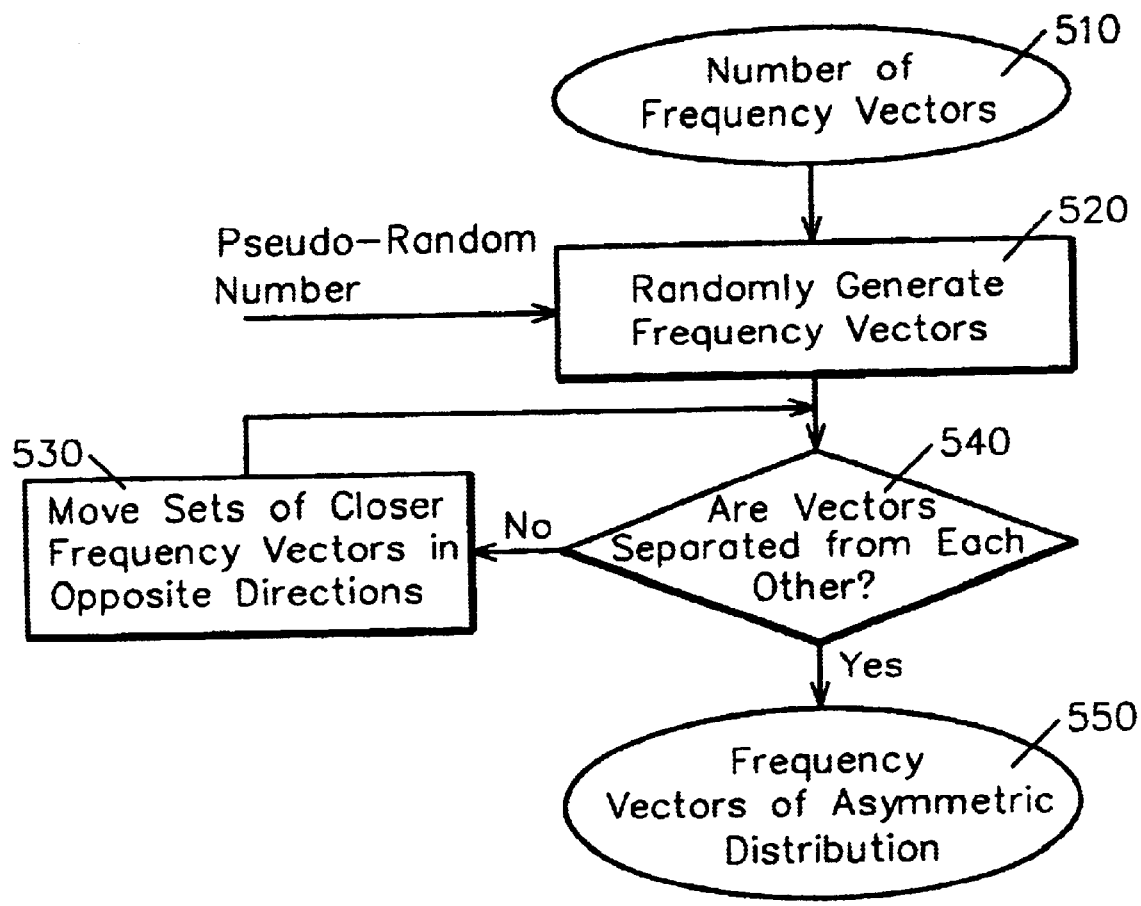
FIG. 5 is a diagram showing a global random distribution creating method.

As shown in FIG. 5, a domain of frequency vectors (e.g., a square domain including an origin) is initially defined, frequency vectors are randomly generated and, then, in order to cause respective frequency vectors to be separated by more than a predetermined distance, if it is determined that there exists any sets of closer frequency vectors, an operation for causing such to frequency vectors to be moved in opposite directions is continued for all of the sets until frequency vectors thereof are caused to be separated by the predetermined distance respectively. At step 520 in FIG. 5, frequency vectors are randomly generated from the number of frequency vectors by using a pseudo-random number. At step 540, it is determined if the frequency vectors are separated from each other by more than a predetermined distance; and, if not, at step 530, any sets of closer frequency vectors are moved in opposite directions respectively, thereby to cause respective frequency vectors to be separated by more than the predetermined distance. Continuing such operations until frequency vectors of all sets are caused to be separated by the predetermined distance, at step 550, frequency vectors of asymmetric distribution may be obtained.

Cellular Random Distribution Creating Method

Figure 6:
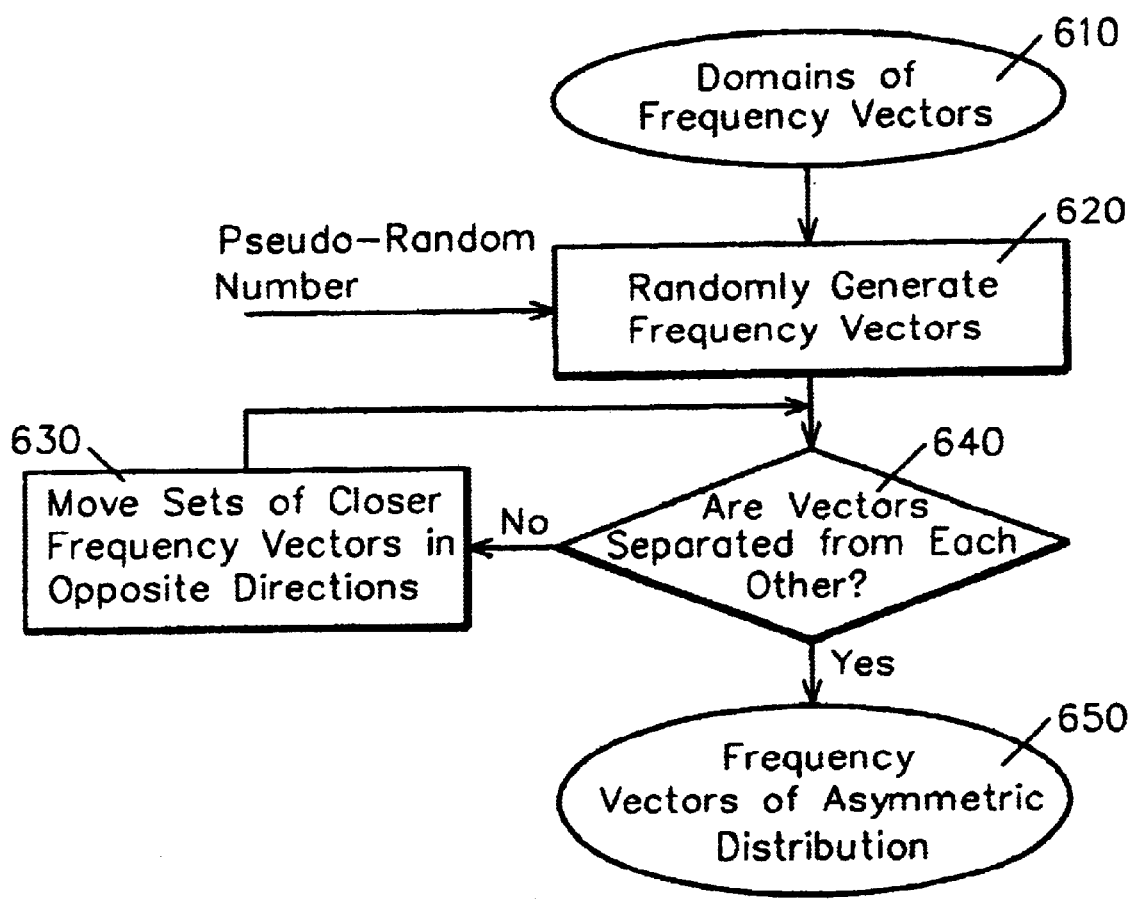
FIG. 6 is a diagram showing a cellular random distribution creating method.
Figure 9:
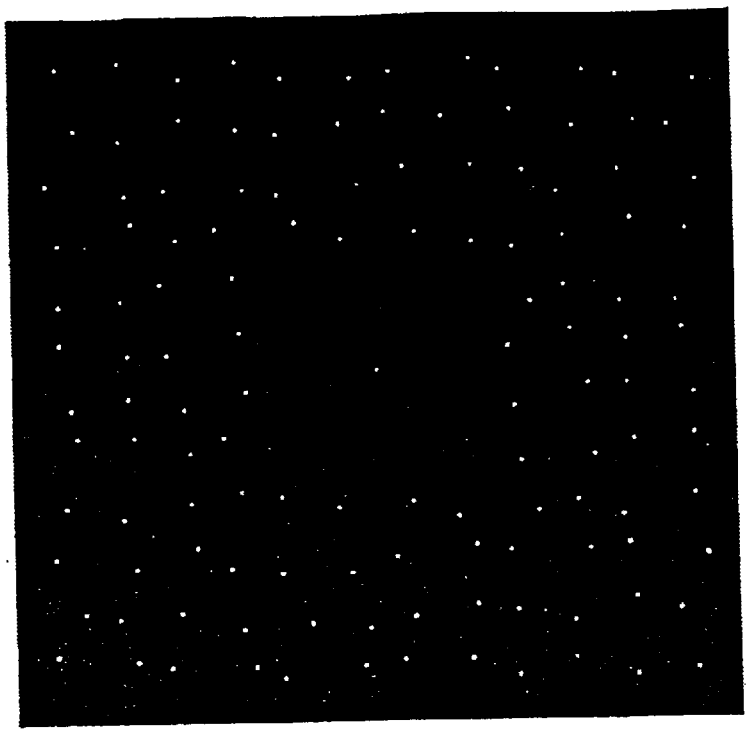
FIG. 9 is a diagram showing an exemplary DFT image, which is created by the cellular random distribution creating method.

As shown in FIG. 6, at step 610, a domain in which each one of the frequency vectors to be entered is initially defined, at step 620, the frequency vectors are randomly generated in the domains and, then at step 640, if it is determined that sets of frequency vectors in the neighboring domains are closer than a predetermined distance, at step 630, they are moved in opposite directions, thereby to cause the respective sets of frequency vectors in the neighboring domains to be separated by more than the predetermined distance. In this way, at step 650, frequency vectors of asymmetric distribution may be obtained. If those domains in which respective frequency vectors are to be entered are separated from each other at the outset, it is possible to eliminate step 630 for causing the frequency vectors to be separated by, more than the predetermined distance. FIG. 9 shows an example of distribution of frequency vectors created in accordance with the cellular random distribution creating method. As shown in this drawing, the center is the origin and 128 frequency vectors are randomly distributed.

Spiral Random Distribution Creating Method

Figure 7:
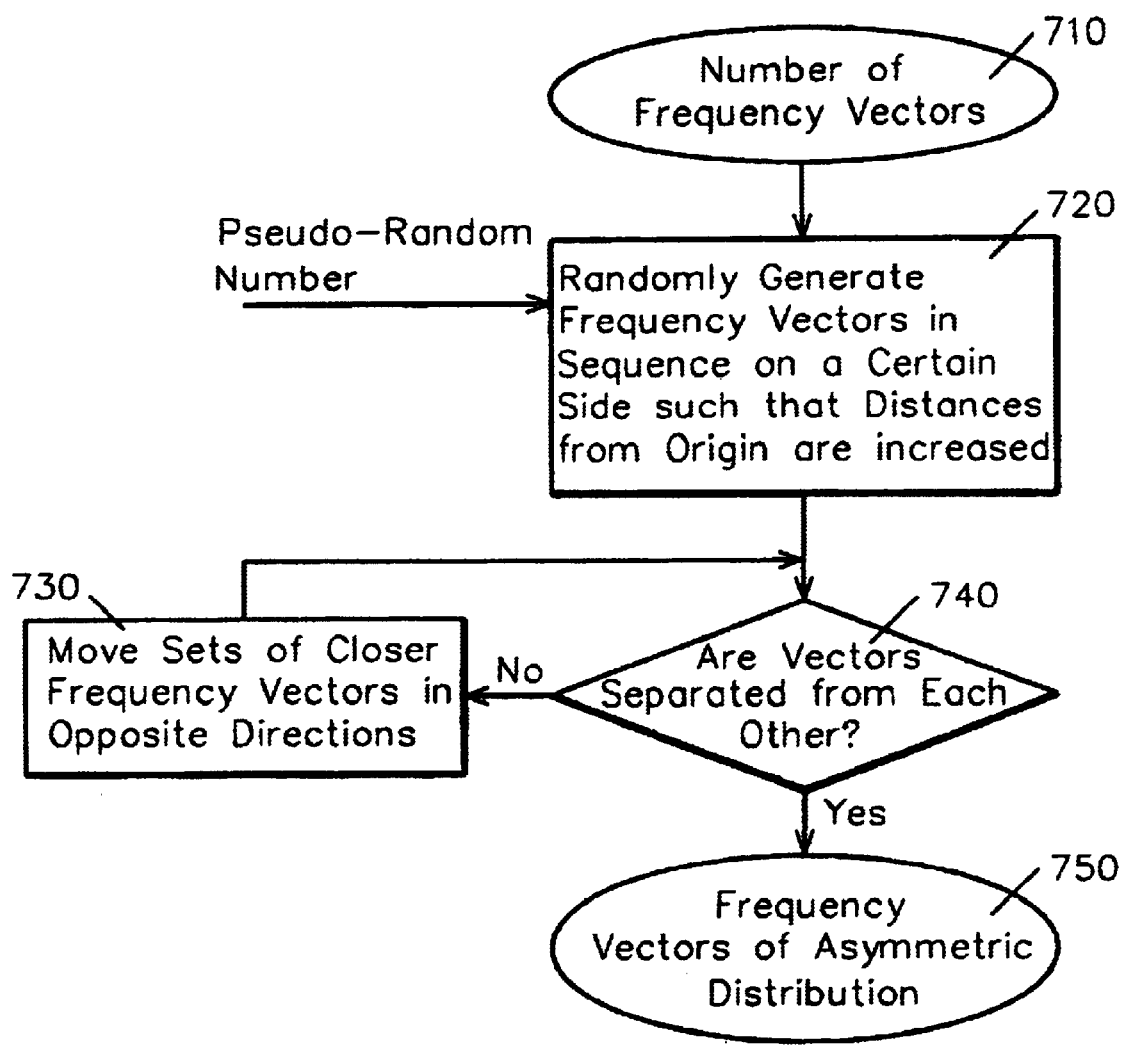
FIG. 7 is a diagram showing a spiral random distribution creating method.
Figure 11:
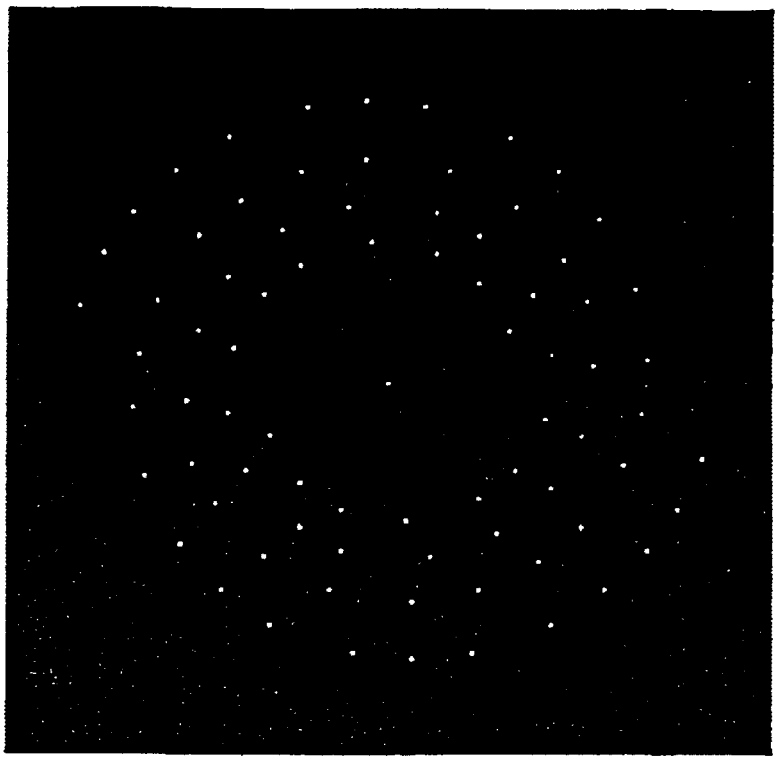
FIG. 11 is a diagram showing an exemplary DFT image, which is created by the spiral random distribution creating method.

As shown in FIG. 7, at step 720, frequency vectors are randomly generated in sequence on a certain side such that distances from the origin are increased. Then, at steps 740 and 730, setting up the distance from the immediately preceding frequency vector and an increment of the distances from the origin to be within certain ranges respectively, frequency vectors are randomly generated. FIG. 11 shows an example of distribution of frequency vectors created in accordance with the spiral random distribution creating method. As shown in this drawing, the center is the origin and 86 frequency vectors are randomly distributed.

In order to cause the embedded pattern to be invisible to a human eye, $r_m$ in equations (1) and (3) are rendered to have a small value. More specifically, $r_m$ is rendered to have a constant value, an approximately constant value, or such a value that is gradually increased as approaching closer to the origin. To take a greater value as approaching the origin is due to a factor that when a natural image is subjected to DFT, a smaller wave number has, in general, higher spectral power. When two dimensional waves are extracted from the embedded image, it is possible to make use of the characteristic that a possible range of amplitude $r_m$ of two dimensional waves is limited. Even if a frequency vector $w_m$ and amplitude $r_m$ of a two dimensional wave are determined, the magnitude of P(u) in equations (1) and (3) may vary depending on phase $q_m$ of a two dimensional wave. In order to cause the maximum value of |P(u)| on integer u to become a minimum, it is optimized with respect to its phase $q_m$.

Figure 8:
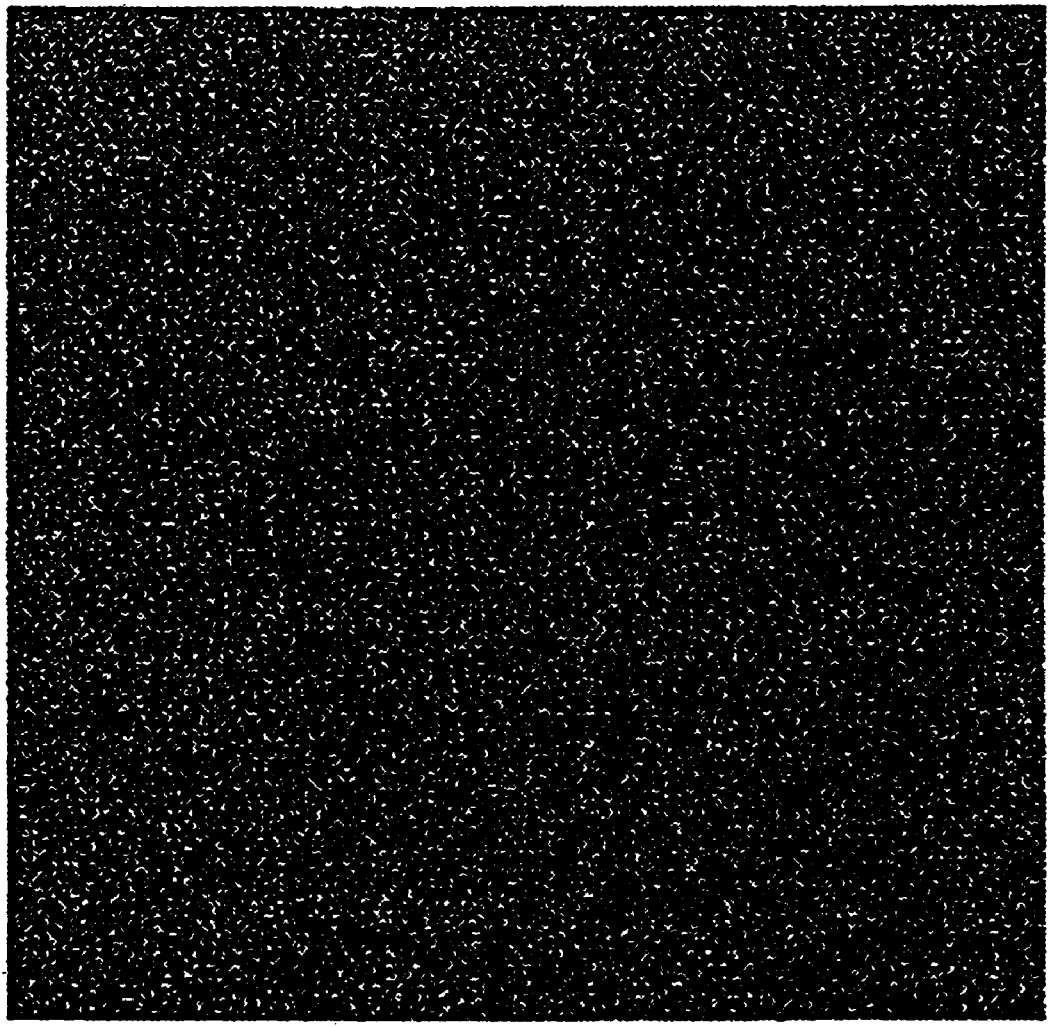
FIG. 8 is a diagram showing a presentation example in a real domain, which is created by the cellular random distribution creating method.
Figure 10:
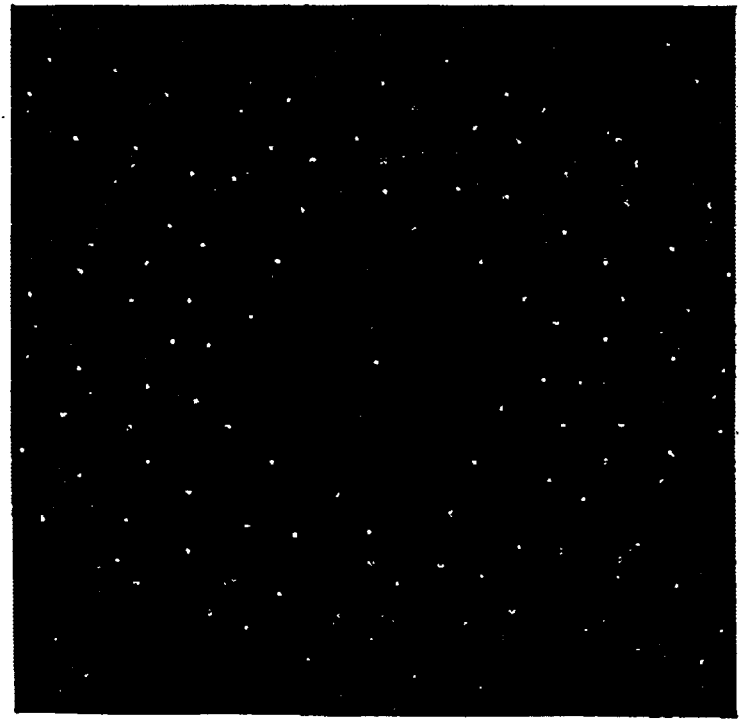
FIG. 10 is a diagram showing rotation in a DFT image of a two dimensional wave pattern, which occurs in connection with rotation of an image.

FIG. 8 shows a presentation example of a pattern in a real domain, which consists of 128 two dimensional waves. Its shading is somewhat emphasized such that it is visible to a human eye. In a real domain, a pattern consisting of a number of two dimensional waves may be seen as noises only even if it is visible at all. FIG. 9 shows an example of its pattern subjected to DFT. As shown in this drawing, the center is the origin and white points are individual two dimensional waves. FIG. 10 shows an image that is obtained by applying DFT to the same image rotated by 30 degrees. It can be seen from this drawing that the center is the origin and the image transformed by DFT is rotated as well. Any geometrical transformation, including rotation and/or scaling, applied to the image is reflected in the DFT image too.

Embedding

Figure 12:
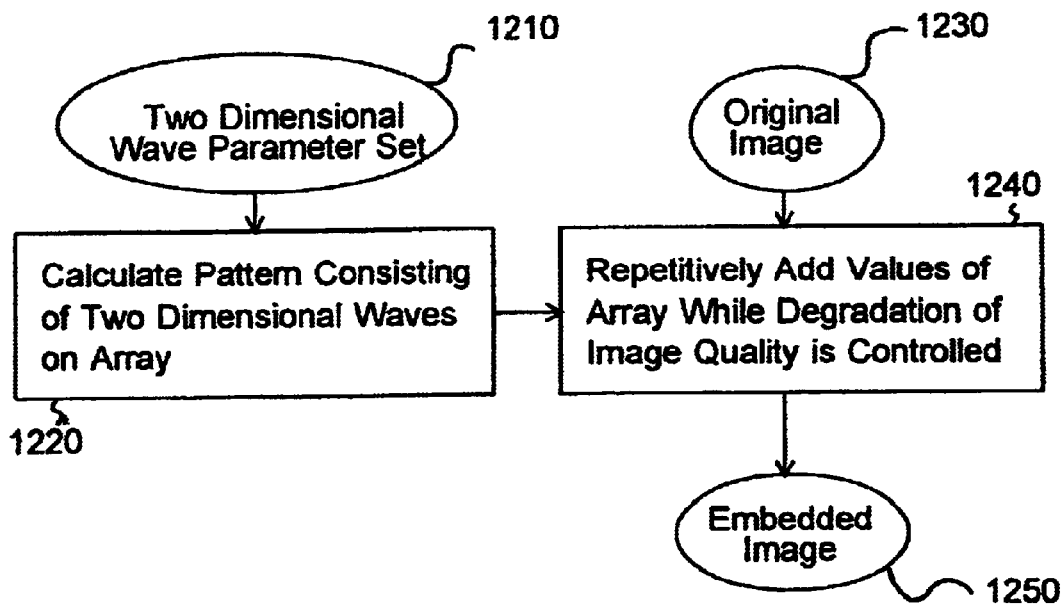
FIG. 12 is a diagram showing a procedure for embedding a two dimensional wave pattern.

FIG. 12 shows a procedure for embedding a pattern consisting of two dimensional waves in an image. Embedding is performed while degradation of image quality is controlled in a real domain. Pattern P(u), consisting of a set of two dimensional waves, is previously calculated on an array, and, at such an intensity level that is invisible or substantially insensitive to a human eye, values of the array are added to or subtracted from each pixel value of the image. When it is desired to cause this pattern consisting of two dimensional waves to coexist with an embedded pattern in accordance with another method, the former pattern (which is rarely destroyed by embedding of another) may be embedded prior to that of latter fragile pattern of digital watermarks.

While the pattern consisting of two dimensional waves may be directly embedded in an image by calculating equation (3) at each point of the image, nevertheless it is better in terms of a lighter calculation load to give periodicity to the embedding pattern P(u), to previously calculate on an array alone that has a size of the period and to add its value to each pixel point of the image. With respect to positive integers $N_x$ and $N_y$, let each frequency vector $w_m=(w_{xm}, w_{ym})$ be taken at its grid point as expressed below.

$$w_{xm}=k_{xm}/N_x, \ w_{ym}=k_{ym}/N_y \quad (16)$$

Here, $k_{xm}$ and $k_{ym}$ are integers. In this case, P(U) has a period $N_x$ in the x axis direction and a period $N_y$ in the y axis direction. Thus, P(u) is calculated on an array of $N_x$ (width) and $N_y$ (height), thereby repetitively using its value. Equation (16) may be rewritten as follows:

$$w_{xm}=(2k_{xm}+1)/2N_x$$

$$w_{ym}=(2k_{ym}+1)/2N_y \quad (17)$$

In this case, P(u) has a period $2N_x$ in the x axis direction and a period $2N_y$ in the y axis direction.

However, inverting a sign for each half of the periods $N_x$, $N_y$. i.e., $n=(N_x, N_y)$, the following equation is obtained.

$$P(u+n)=-P(u) \quad (18)$$

In this case, P(u) is similarly calculated on an array of $N_x$ (width) and $N_y$ (height), thereby repetitively using its value with accompanied sign inversion as the case may be.

When pattern P(u) is added to each pixel, it is weakly embedded depending on the characteristics of an image around its pixel point. That is, as expressed in the following equation, α is rendered to have a small value in a domain where pixel values are smoothly changed.

$$I'(u)=I(u)+\alpha P(u) \text{ where } 0 \leq \alpha \leq 1 \quad (19)$$

Figure 13:
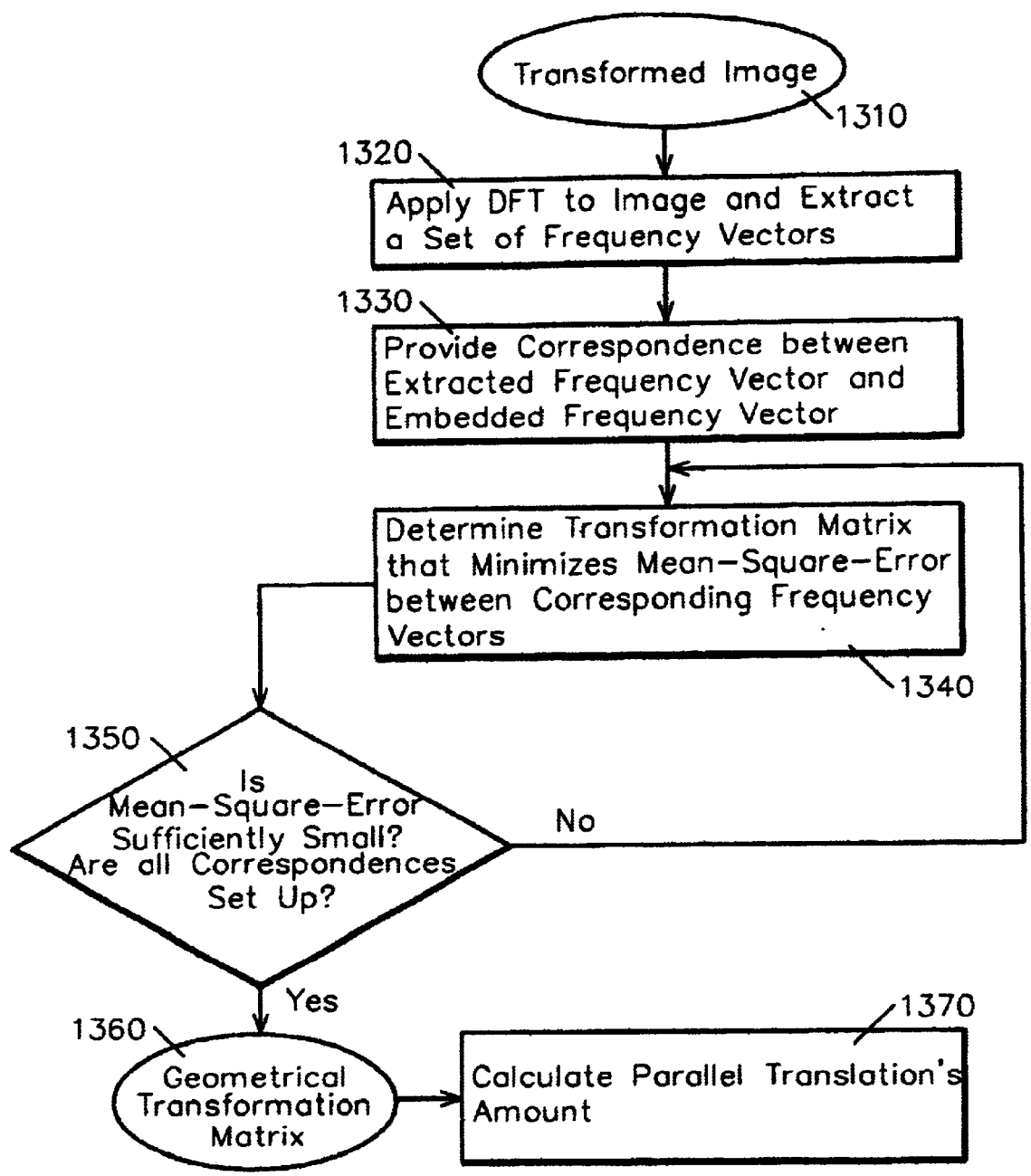
FIG. 13 is a diagram showing a procedure for extracting geometrical correction information from a two dimensional wave pattern.

Extraction of Two Dimensional Waves and Calculation of Linear Coordinate Transformation As shown in FIG. 13, a procedure for determining a linear coordinate transformation applied to an image, which contains an embedded pattern consisting of a set of two dimensional waves therein, is formulated as stated below.

<1> At step 1320, DFT is applied to the image, the resultant image G(k) is subjected to image processing, and a set of frequency vectors $\{w'_m\}$ of two dimensional waves is extracted.

<2> At step 1330, a portion of correspondences between the extracted frequency vectors and the embedded frequency vectors is initialized (to provide correspondences).

<3> At step 1340, based on the initialized correspondences, a matrix B that is to minimize the following equation of a mean-square-error is determined.

$$d(B)=(1/M)\Sigma|w'_m - Bw_m|^2 \quad (20)$$

Alternatively, a matrix B that is to minimize the following equation of a mean-square-error may be determined.

$$d(B)=(1/\Sigma r_m)\Sigma r_m |w'_m - Bw_m|_2 \quad (21)$$

Here, M stands for the number of frequency vectors. If, in equation (21), weights $r_m$ are not the same, it is equivalent to equation (20).

<4> At step 1350, if d(B) is larger than a predetermined value, correspondences of frequency vectors are set up again before returning to step 1340. Otherwise, the number of correspondences between the extracted frequency vectors and the embedded frequency vectors is increased before returning to step 1340. If all of the correspondences are set up and if d(B) is smaller than the predetermined value, linear coordinate transformation A (i.e., geometrical transformation matrix) is obtained at step 1360 in accordance with the following equation.

$$A=(B^{-1})^T \quad (22)$$

In the linear coordinate transformation A so obtained, there is indeterminacy of A or −A. Further, in an application of digital watermarks, when it is desired to extract information embedded in accordance with a method other than that of this invention, it may be necessary to determine a parallel translation's amount b of equation (4). That is, the following procedure may be required.

<5> At step 1370, a parallel translation's amount b is determined using phase of the extracted two dimensional waves, and/or such a parallel translation's amount b that maximizes detection reliability of information embedded in accordance with another method is searched for.

Figure 14:
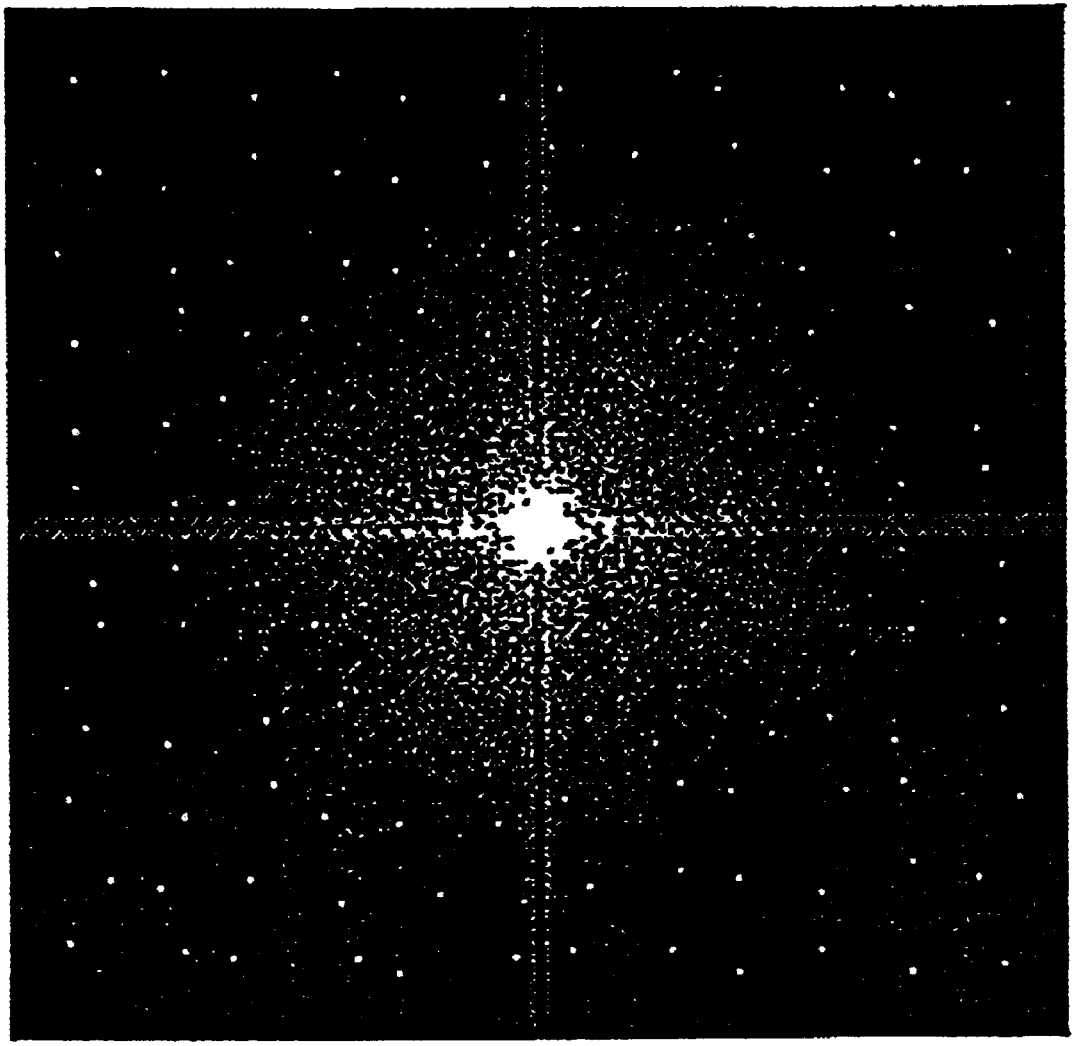
FIG. 14 is a diagram showing a DFT image of an image, which has a two dimensional wave pattern embedded therein.

The details of 1–5 will now be described in greater detail.
<1> Extraction of Two Dimensional Waves
FIG. 14 shows a DFT image of an image, which contains an embedded pattern consisting of two dimensional waves therein. Any difference from the DFT image of two dimensional wave pattern shown in FIG. 9 is caused by each original image. As suggested in FIG. 14, for the purpose of extracting the embedded two dimensional waves, it is necessary to appropriately process the DFT image of a transformed image.

Figure 15:
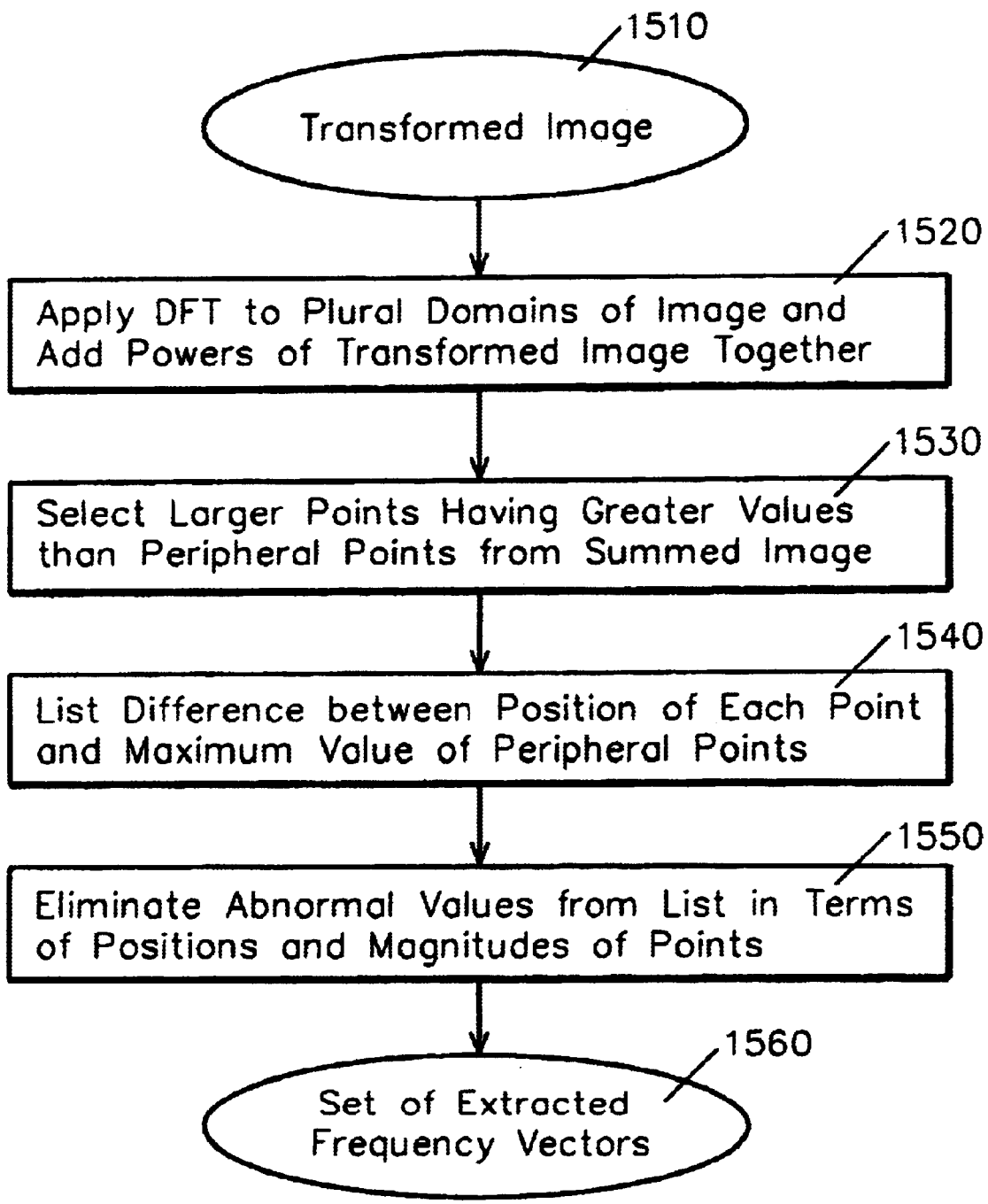
FIG. 15 is a diagram showing a procedure for extracting frequency vectors from an image.

FIG. 15 shows a procedure for extracting a set of frequency vectors {w'} of the embedded two dimensional waves from the transformed image in accordance with this invention.

(1) At step 1520, DFT or FFT is performed in a plurality of domains of an image, and powers |G(k)| of the resultantly transformed image G(k) are summed together.

(2) At step 1530, from the image $G_{sum}(k)$ that is obtained by the summation, larger points having greater values than the peripheral points are selected.

(3) At step 1540, the maximum value of the peripheral points is subtracted from a value of each of the selected points and, if a difference is less than zero, this value is discarded. On the other hand, if a difference is positive, then the selected points are arranged in a descending (large-small) sequence of their respective positive differences.

(4) At step 1550, if any of the selected points is the origin itself or it is very close to the origin, or if $G_{sum}(k)$ of such a point is far greater than $G_{sum}(k)$ of the remaining points, these points will be eliminated, thereby to extract frequency vectors that are less than in number than those embedded two dimensional waves arranged in the descending sequence at step 1530.

As already described above in connection with the principles of this invention, from the condition that a pixel value is a real number, it follows that the powers |G(k)| of the resultant DFT image, a set of embedding frequency vectors, as well as a set of the extracted frequency vectors are symmetric about the origin. Therefore, by making use of this origin symmetry, summation of powers of the transformed image at step 1520 and/or a searching extent at step 1530 may be reduced to one half. Also, saving of storage areas of a set of the embedding frequency vectors, as well as a set of the extracted frequency vectors may be reduced to one half. A width of a domain for DFT at step 1520 may not be necessarily the same as a width of an array or period for P(U) at the time of embedding. A larger width of a DFT domain results in an improvement of separation from the original image at the time of extraction and/or calculation accuracy of the matrix B in equation (9). Using the windowing function in connection with DFT, it is possible to obtain a sharper image. Peripheral points obtained at step 1530 may not be necessarily the same as peripheral points obtained at step 1540. Step 1530 is used for selecting the locally largest point, whereas step 1540 is used for confirming a fact that a given point is larger than the others is not accidental but intentional. Such a fact is confirmed by a demonstration that the given point is far more larger than its peripheral points. As expressed in equation (14) associated with the basic principle, part 2 of this invention, if frequency vectors are not on grid points of DFT ($w_x=k_x/N$, $w_y=k_y/N$), they will appear as an image at consecutive grid points. Therefore, a better result will be obtained if the peripheral points obtained at step 1540 are limited to those neighborhood points except for immediately neighboring points.

<2> Setting Up of Correspondences Between Embedded Two Dimensional Waves and Extracted Two Dimensional Waves Assuming that M' stands for the number of extracted frequency vectors and M for the number of embedded frequency vectors, the number-of possible correspondences is M!/(M−M')!. Also, the extracted frequency vectors include fakes due to an original image, the number of such combinations is further increased. Therefore, it becomes critical to efficiently set up correspondences between the extracted frequency vectors and embedded frequency vectors. If geometrical processing applied to an image includes rotation, inversion, and scaling only, the large-small sequence of frequency vectors will not be changed by the transformation matrix B. However, saving of the large-small relations of the frequency vectors is merely an approximate one. On the other hand, with respect to the frequency vectors that are corresponded with each other by the transformation matrix B, the following relation is accurately satisfied subject to a condition that an error occurring at the time of a geometrical transformation is ignored.

$$\det(w'_m w'n) = \beta \det(w_m wn) \quad (23)$$

Here, det( ) stands for a determinant. That is, $\det(ab) = a_x b_y - a_y b_x$, and $\beta$ is a constant defined by $\beta = \det(B)$. This relation is clear from the following equation.

$$\begin{aligned} \det(w'_m \ w'n) &= \det(B \ w_m \ B \ wn) \\ &= \det(B \ (w_m \ wn)) \\ &= \det(B) \det(w_m \ wn) \end{aligned} \quad (24)$$

Using the relation of equation (23), it is possible to efficiently determine correspondences, as described below with reference to FIG. 16 or FIG. 17. It is assumed here for either method that a set of embedded frequency vectors {w} and a set of extracted frequency vectors {w'} are saved in a storage area as far as their halves being symmetric about the origin are concerned.

Large-Small Relation Method

Figure 16:
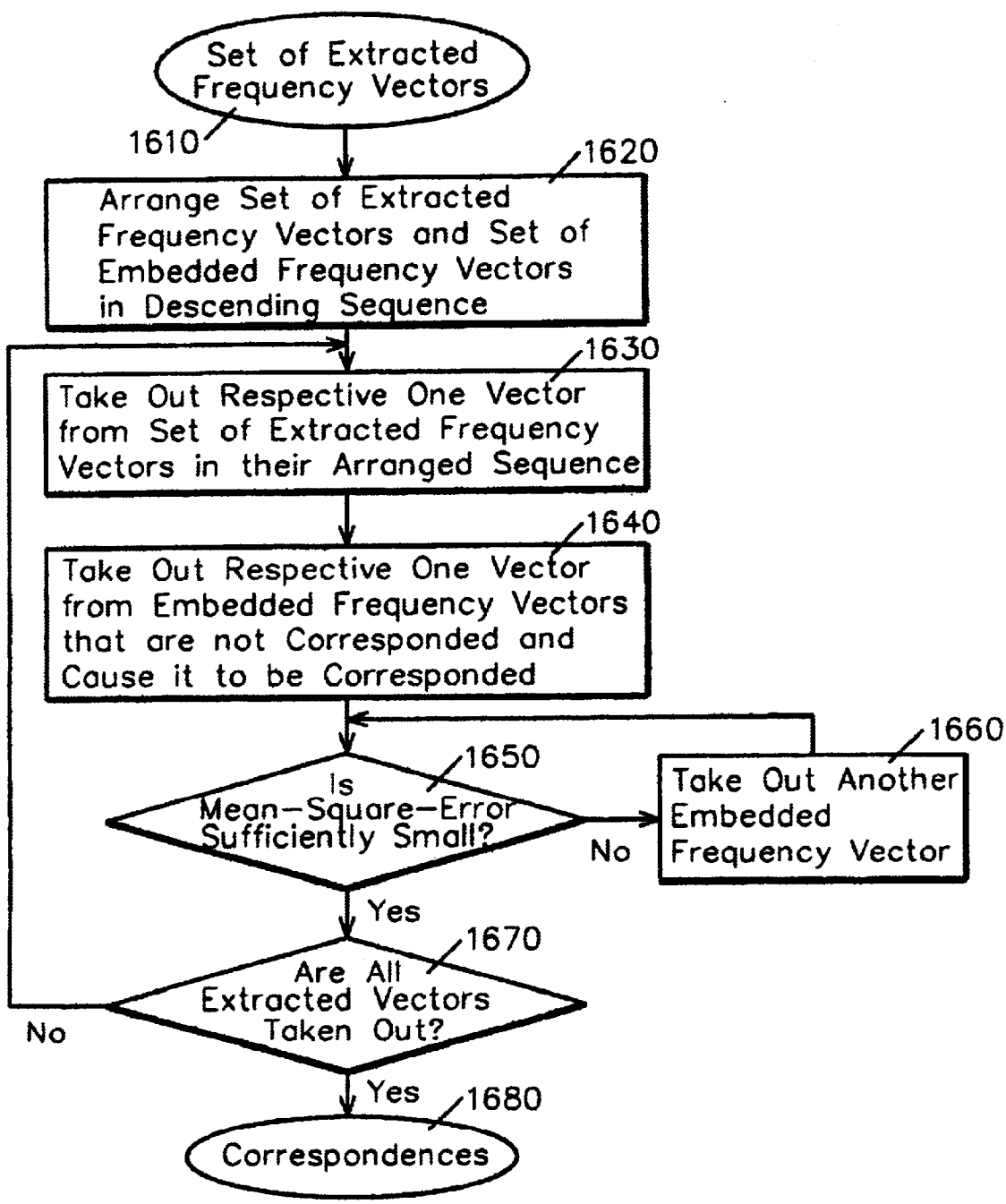
FIG. 16 is a diagram showing a procedure, part 1, for creating a correspondence between an embedded frequency vector and an extracted frequency vector.

As shown in FIG. 16, with respect to a set of embedded frequency vectors {w} and a set of extracted frequency vectors {w'}, their frequency vectors are arranged in the large-small sequence respectively and, then, correspondences therebetween are increasingly expanded. More particularly, at step 1620, the set of extracted frequency vectors and the set of embedded frequency vectors are arranged in their large-small sequence. At step 1630, from the set of extracted frequency vectors, each respective one of the frequency vectors is taken out in their arranged sequence and this is referred to as $w_m'$. Concurrently, with respect to either one of determinants $\det(w'_{m-2} w'_m)$ or $\det(w'_{m-1} w'_m)$ which has a larger absolute value, a sign of $w_m'$ is selected such that the determinant has a positive value. At step 1640, from the set of extracted frequency vectors {w} that are not corresponded, one of the frequency vectors is taken out in their arranged sequence and this is referred to as $w_m$. Concurrently, corresponding with the selection of a sign at step 1630, a sign of $w_m$ is selected such that either one of the determinants $\det(w_{m-2} w_m)$ or $\det(w_{m-1} w_m)$ has a positive value. At step 1650, with respect to m frequency vectors that are provided with correspondences therebetween, a mean-square-error (equation (20) or (21)) is determined by a method to be described in the next section and, then, it is tested to see if the error is sufficiently small. If so, the process proceeds to step 1670. Otherwise, at step 1660, another untested one of the embedded frequency vectors is taken out, which is referred to as $w_m$, a sign of $w_m$ is adjusted in line with the sign of $w_m'$ similarly to step 1640, and the process proceeds to step 1650 again. If there is no such untested one of the embedded frequency vectors any longer, then $w_m'$ is regarded as a faked one of the embedded frequency vectors and it is eliminated from the correspondences. At step 1670, if all of the extracted frequency vectors are taken out, and if the number of corresponded frequency vectors reaches to a predetermined number, then the process is terminated at step 1680. If not reached, selections of $w_1'$, $w_2'$ are changed by a predetermined number of attempts, and the process returns to 1630.

<Decomposition Method>

First, a linear combination is defined as follows:

$$w_m = C_{m1} w_1 + C_{m2} w_2 \quad (25)$$

Decomposition means to express a frequency vector by using other two frequency vectors and the above coefficients ($C_{m1}$, $C_{m2}$)). These coefficients may be determined as follows by using the above described determinants.

$$C_{m1} = \det(w_m w_2) / \det(w_1 w_2)$$

$$C_{m2} = \det(w_1 w_m) / \det(w_1 w_2) \quad (26)$$

Thus, the corresponding embedded frequency vectors and extracted frequency vectors have the same decomposition coefficients respectively.

Figure 17:
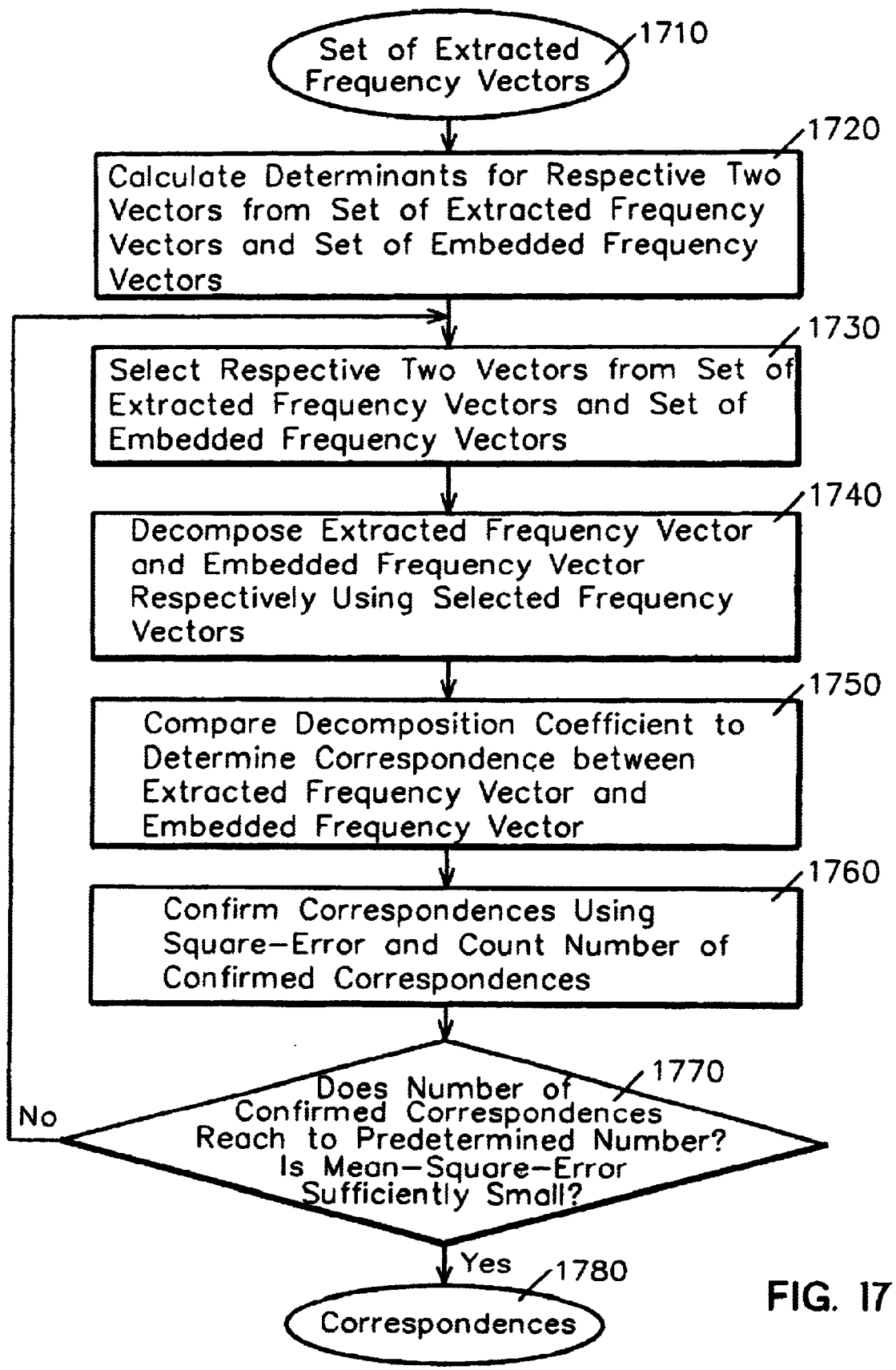
FIG. 17 is a diagram showing a procedure, part 2, for creating a correspondence between an embedded frequency vector and an extracted frequency vector.

FIG. 17 shows a method of creating correspondences by using the decomposition coefficients. Initially, at step 1720, with respect to a set of extracted frequency vectors {$w'_m$} and a set of embedded frequency vectors {w}, determinants $\det(w'_m w'n)$ and $\det(w_m wn)$ are calculated respectively. At step 1730, from the set of extracted frequency vectors {w'} and the set of embedded frequency vectors {w}, two frequency vectors {$w'_1$, $w'_2$} and {$w_1$, $w_2$} are selected in the descending order of the determinants' absolute values that have been calculated at step 1720. Signs of $w'_2$ and $w_2$ are taken such that the determinants have a positive value. At step 1740, using the selected {$w'_1$, $w'_2$} and {$w_1$, $w_2$}, the extracted frequency vector $w'_m$ and the embedded frequency vector $w_m$ are decomposed by using equation (26). At step 1750, the decomposition coefficients are compared with each other to determine a correspondence between the extracted frequency vector $w'_m$ and the if embedded frequency vector $w_m$. For example, each of the embedded frequency vectors is corresponded with an extracted one of the frequency vectors that has the closest decomposition coefficient. If this causes a plurality of embedded frequency vectors to be corresponded with the same one of the extracted frequency vector, the one having the closest decomposition coefficient is selected as correspondence. At step 1760, correspondences between the frequency vectors so obtained are confirmed by using a square-error and, then, the number of the confirmed correspondences are counted. For example, while the number of corresponding pairs is caused to be sequentially increased, a least mean-square-error (equation (20) or (21)) is determined by a method to be described in the next section and, if it is large, the present correspondence is discarded. Otherwise, this correspondence is left as a valid correspondence. If, at step 1770, it is determined that the number of valid correspondences reaches to a predetermined number, and if a mean-square-error is small, the process is terminated at step 1780. If not reached, selections of {$w'_1$, $w'_2$} and {$w_1$, $w_2$} are changed by a predetermined number of attempts, and the process returns to step 1730.

<3>, <4> Calculation of Linear Coordinate Transformation From Correspondences of Two Dimensional Waves Due to resampling of an image (in case of rotation, scaling, and the like) as well as a quantization width (in case of extraction), frequency vectors extracted from an image may contain random noises as expressed in the following equation.

$$w'_m = Bw_m + \text{random noise} \quad (27)$$

Therefore, as provided in equation (20) or (21), by using the linear transformation matrix B for minimizing a mean-square-error or a sum between the embedded frequency vectors that have been linearly transformed and the extracted frequency vectors, B of equation (9) is determined. Letting a width of a DFT domain be N, a quantization width is equal to 1/N. Thus, letting the quantization width of DFT be larger than the effect of resampling, a condition for discarding an assumed correspondence is met whenever a mean-square-error that has been minimized with respect to B satisfies the following equation.

$$d(B) > (1/N)^2 \quad (28)$$

Because equation (20) is regarded as a special case of equation (21), described below is a procedure for calculating the matrix B that is to minimize equation (21). Let matrices S and V be defined as follows:

$$S = \Sigma_m r_m w_m w_m^T \quad (29)$$

$$V = \Sigma_m r_m w'_m w_m^T \quad (30)$$

In this case, the linear transformation matrix B for minimizing equation (21) may be determined by the following equation.

$$B = VS^{-1} \quad (31)$$

Here, b a$^T$ is a matrix that has the following components in line with the definition of the transposition operator T.

$$b_x a_x \quad b_x a_y$$

$$b_y a_x \quad b_y a_y$$

For simplicity, proof of the above equation is not detailed herein.

<5> Calculation of Parallel Translation's Amount

Once the transformation matrix B is determined, the parallel translation's amount b may be determined by embedding/extraction of a pattern consisting of two dimensional waves, or by round-robin attempts to extract digital watermarks with shifting positions thereof.

Method of Using Phase of Pattern Consisting of Two Dimensional Waves

Based on equation (8) that expresses a relation between a phase of an extracted two dimensional wave and a phase of an embedded two dimensional wave, it is possible to determine a parallel translation's amount b. However, because a measured amount directly obtained from an image is a DFT image G(u), there remains uncertainties in phase $q'_m$ by a factor of multiples of 2p. Also, individual phase $q'_m$ is distorted by two dimensional waves due to an original image at the time of embedding. Therefore, a parallel translation's amount b is determined by the following procedure:

(1) Phase $q'_m$ of an extracted two dimensional wave, whose correspondence has been established, and its reliability $p_m$ are determined from a DFT image. Reliability is determined by using differences of values from peripheral points.

(2) With respect to a parallel translation's amount b, the following equation is to be minimized.

$$E(b) = \Sigma_m p_m \{1 - \cos(2p(q_m - q'_m - w'^T_m b))\} = \Sigma_m p_m 2 \sin 2(p(q_m - q'_m - w'^T_m b)) \quad (32)$$

E(b) stands for a weighted sum of phase deviations or displacement on a complex plane. In order to reduce a calculation load, equation (32) is simplified by approximation for accelerating calculation, or using phases of a small number of reliable two dimensional waves to reduce the number of candidates in equation (32), thereby to minimize equation (32) using phases of all of the two dimensional waves established around these candidates.

Method of Maximizing Separation Between Signal and Noise

It is assumed here that the transformation matrix B is determined using a pattern of two dimensional waves and that geometrical transformations, such as rotation and scaling of an image other than parallel translation, have been corrected. Parallel translation's amount b may be determined by round-robin attempts to extract digital watermarks with shifting positions thereof, without using phases of two dimensional waves. Essential points of this case reside in that a table is used for reducing calculation amounts in carrying out the round-robin attempts, and that a criterion for determining the best parallel translation's amount becomes important.

It is assumed here that, because of robustness to clipping, digital watermarks for embedding multi-bit information are periodically embedded in an image in a form of the same pattern. It is also assumed that a calculation mechanism, having pixel values of a block (square domain) as its inputs, is controlled by a key and that one bit is detected depending on a sign of its output sum. In this case,. the earliest parallel translation's amount is determined by the following procedure:

(1) With respect to each pixel point of a domain surrounded by a period, such a square domain having the said pixel point as an end point is previously input to the calculation mechanism for determining its value f(u, k) and putting the value into a table. Here, u stands for a position of a pixel point, and k stands for a block pattern. determined by the key.

(2) With respect to each pixel point of a domain surrounded by a period, the said pixel point is deemed to be a reference point of the key, the following equation is calculated based on the table created in accordance with the procedure (1), and the largest pixel point is deemed to be a reference point of the key.

$$S_u M(f(u, k_u)) \quad (33)$$

Here, u stands for a value on the table that corresponds to a bit. M stands for a function for separating a signal from a noise, which is expressed by the following equation.

$$M(x) = \log(|x| + a) \quad (34)$$

Or, it may be an approximation function of equation (34). If a reference point of the key is correctly selected, a bit is given by a sign of $f(u, k_u)$. Since a value of a bit is not known to a detection device, it is not determinable whether it is positive or negative. However, a value that is far from an expected value zero of a noise would have been embedded in bit information. Therefore, it is effective to use such a function that emphasizes a difference from a noise. That is, $M(x)=|x|$ is more effective than $M(x)=x^2$, whereas $M(x)=\log(|x|+a)$ is more effective than $M(x)=|x|$. Parameter a is added such that there is no singularity at x=0. Since the logarithmic function has a larger calculation load, an increasing function for emphasizing a difference from zero, for example, the following equation is used as an approximation function.

$$M(x)=-1/(|x|+a) \tag{35}$$

Or, $$M(x)=-1/(|x|^2+a) \tag{36}$$

Hardware Embodiment

Figure 18:
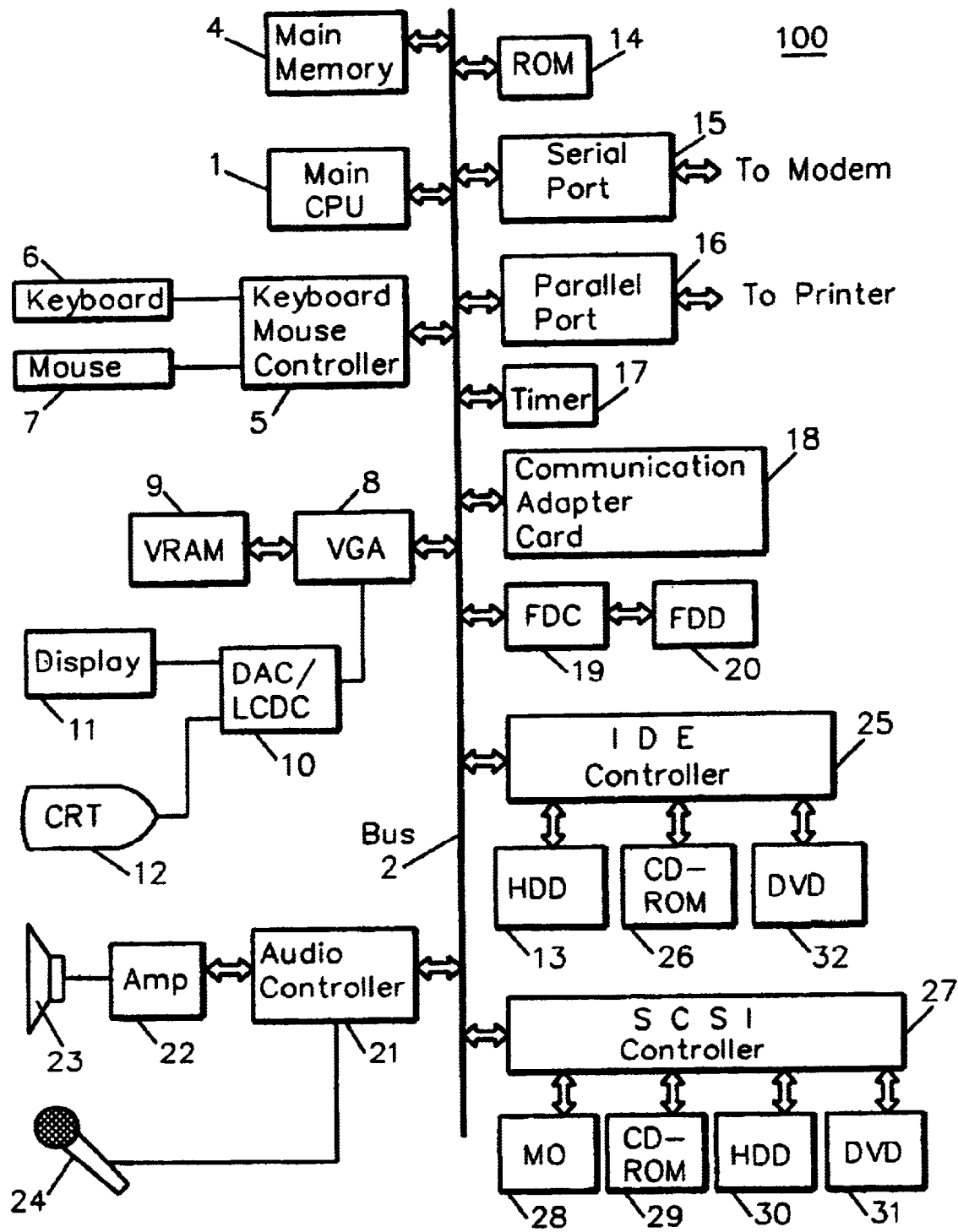
FIG. 18 is a diagram showing a hardware embodiment for use in performing embedding of two dimensional waves, geometrical transformation identification of an image, digital watermarking, geometrical correction, and position control.

Now, with reference to the drawings, we will describe a hardware embodiment for performing embedding of two dimensional waves, geometrical transformation identification of an image, geometrical correction, and digital watermarking in accordance with this invention. In FIG. 18, there is schematically shown a hardware configuration of a system 100 used in this invention. The system 100 includes a central processing unit (CPU) 1 and a memory 4. CPU 1 and the memory 4 are connected to a hard disk drive 13 as an auxiliary storage device (or another storage medium drive such as a CD-ROM drive 26 or a DVD drive 32) via a bus 2 and an IDE controller 25. Similarly, CPU 1 and the memory 4 are connected to a hard disk drive 30 as an auxiliary storage device (or another storage medium drive such as an MO drive 28, a CD-ROM drive 29 or a DVD drive 31) via the bus 2 and a SCSI controller 27. A floppy disk drive 20 is connected to the bus 2 via a floppy disk controller 19. Preferably, an image subject to said embedding and created two dimensional waves are stored into an appropriate storage medium drive such as the hard disk drive 30, CD-ROM drive 29 or DVD drive 31, for loading them into the memory 1 and for processing therein. Also, an embedded image and a geometrically corrected image are preferably stored into said storage medium drive.

A floppy disk inserted into the floppy disk drive 20, the hard disk drive 13 (or another medium such as an MO, CD-ROM or DVD) and/or a ROM 14, is capable of storing a computer program code or data for practicing this invention. At the time of execution, this computer program code is loaded into the memory 4 such that it cooperates with an operating system to provide instructions to CPU or the like. This computer program code may be compressed or divided into a plurality of segments for storing onto a plurality of media. Also, the system 100 may be provided with user interface hardware, including a pointing device (such as a mouse or a joystick) 7 or a keyboard 6 for input entry, as well as a display 12 for presenting visual data to a user. Also, a printer and a modem may be connected via a parallel port 16 and a serial port 15 respectively. This system 100 may be connected to a network via the serial port 15 and a modem or a communication adapter 18 (Ethernet or token ring card) for communicating with other computers. Also, a remote transceiver may be attached to the serial port 15 or the parallel port 16 for transmitting/receiving image data by means of infrared rays or radio. When it is desired to capture an externally provided original image into this system 100, an image input device (digital camera, scanner, digital video camera or the like) may be connected to the serial port 15, parallel port 16 or SCSI controller 27. Additionally, a storage medium such as a floppy disk or CD-ROM may be used, or it may be created by the user interface hardware of this system 100.

A speaker 23 receives audio signals that are D/A (digital/analog) converted by an audio controller 21 via an amplifier 22, and outputs the audio signals as sounds. Also, the audio controller 21 may perform an A/D conversion of audio information received from a microphone 24, thereby to capture the external audio information into the system. It will be readily understood from the foregoing that the system of this invention may be implemented by a communication terminal having communication functions, including a conventional personal computer (PC), a workstation, a notebook PC, a palm top PC, a network computer, a computer incorporated into a variety of household electric appliances such as a TV set, a game machine having communication functions, a telephone set, a FAX machine, a portable telephone set, a PHS, an electronic organizer or the like, and any combinations thereof. Note, however, that these elements are listed for exemplification purpose only, and all of these elements are not necessarily equated with essential elements of this invention.

Figure 2:
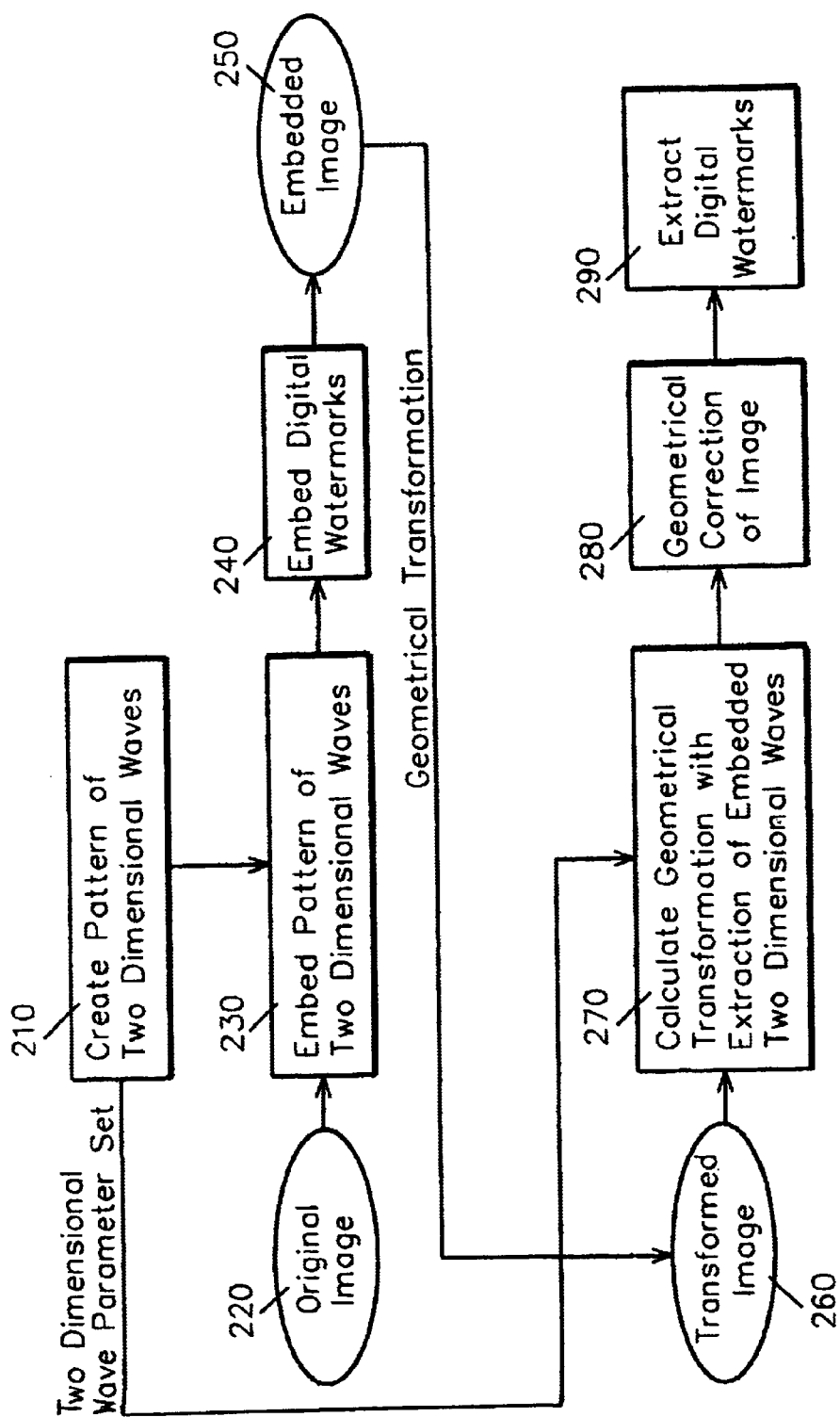
FIG. 2 is a diagram showing an application of the geometrical correction system to digital watermarking.

In FIG. 2, there is shown a digital watermarking system having robustness to geometrical transformation, which is configured by combining a geometrical correction system of this invention with a conventional watermarking technique. After embedding a predetermined pattern consisting of two dimensional waves and created at block 210 in an original image 220 at block 230, digital watermarks are embedded at block 240. An embedded image 250 created in this way is subjected to application of a geometrical transformation due to some factors, thereby to form a transformed image 260. Using this transformed image 260 as an input, embedded two dimensional waves are extracted at block 270. In so doing, the applied geometrical transformation is calculated and, at block 280, this image is geometrically corrected to regenerate the original image. Then, at block 290, the digital watermarks are detected. As described, a method of this invention, being adapted for intentionally embedding and extracting asymmetric two dimensional waves, functions independently of digital watermarking and, thus, it becomes possible to accurately and rapidly detect a geometrical transformation applied to the original image even where an image having digital watermarks embedded therein is subjected to clipping, rotation, scaling, anisotropic scaling, and the like. In other words, it is possible to provide geometrical correction that has very high affinity or compatibility with the digital watermarking techniques.

Figure 3:
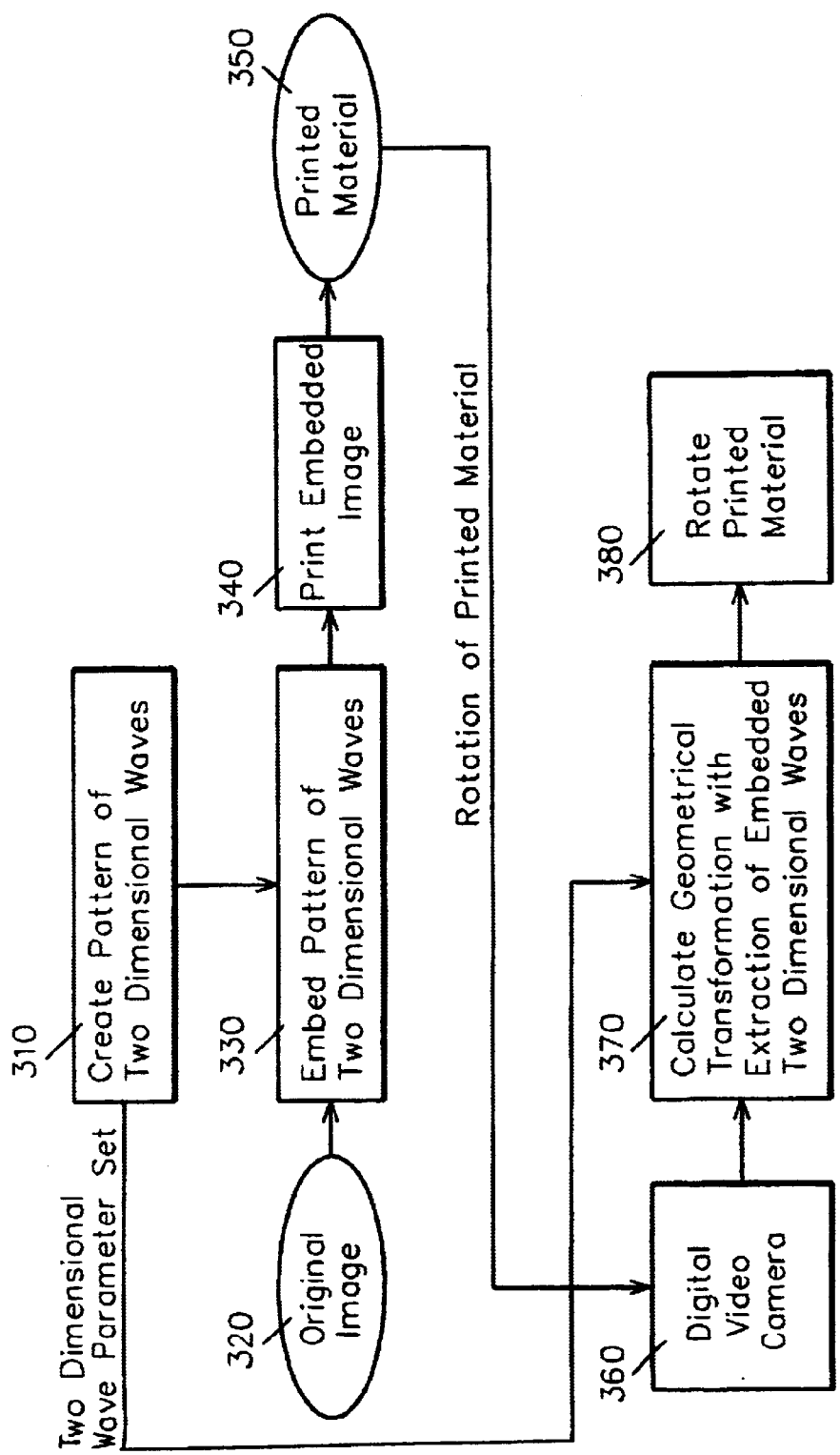
FIG. 3 is a showing an application of the geometrical correction system to orientation control of a printed material.

FIG. 3 shows an embodiment, wherein this invention is applied to control an orientation of a printed material. At block 310, a two dimensional wave pattern is created. At block 330, this is embedded in an original image 320, orientation of which is to be desirably controlled. At block 340, the image that has the two dimensional wave pattern embedded therein is printed. After the printed material is rotated and moved, at block 370, the embedded two dimensional waves are extracted from an output of an image reader such as a digital video camera and a geometrical transformation is calculated. Based on this, at block 380, the printed material is rotated and moved to a desired direction, thereby to control its orientation and position. Replacing the digital video camera with another device such as a CCD sensor, and detecting two dimensional waves from the image in a real-time manner, it becomes possible to automatically control an orientation and a position of a manufacture on a factory's belt conveyor. In such a case, the printed material may be a three dimensional object that has an image affixed thereto so far as the image has two dimensional waves embedded therein. Alternatively, it is also possible to embed the inventive two dimensional waves in the object itself.

By way of example, in a situation where a manufacturing process requires accurate position control of a manufacture piece (object), the inventive two dimensional waves are directly embedded in a surface of the manufacture piece. In case of performing position control, a geometrical transformation is calculated from an image outputted by a digital camera or the like, thereby allowing the desired position control to be accurately carried out. Note that the position control in this case is capable of coping with rotation, scaling, anisotropic scaling, parallel translation and the like. Further, even where the object that has two dimensional waves embedded therein is geometrically deformed due to any changes in an external environment (e.g., temperature, humidity, and the like), it becomes possible to perform position control the object.

As described above, in accordance with this invention, it is possible to easily and rapidly identify geometrical transformations applied to an image in a accurate manner without using its original image. Also, it is possible to provide a method and system for embedding two dimensional waves in an image, thereby to easily control invisibility and/or degradation of image quality. Also, it is possible to provide a method and system that are capable of detecting geometrical transformations applied to an original image even where an image including digital watermarks is subjected to clipping, rotation, scaling, anisotropic scaling, and the like.

Further, even if a digital watermarking image that has the inventive two dimensional waves embedded therein is artificially subjected to a geometrical transformation in a distribution process, or it is subjected to a mechanical geometrical transformation by a scanner, FAX machine or the like, it is still possible to identify such a geometrical transformation and correct it, thereby to regenerate the digital watermarking image. That is, it is possible to provide a technical means adapted for use in copyright protection, thereby facilitating distribution of digital contents.

The invention has been described with reference to several is specific embodiments. One having skill in the relevant art will recognize that modifications may be made without departing from the spirit and scope of the invention as set forth in the appended claims.

Having thus described our invention, what we claim as new and desire to secure by Letters Patent is:

1. A two dimensional wave embedding system for embedding two dimensional waves in an image to identify at least one geometrical transformation which has been applied to the image, comprising:
   (a) means for storing the image into a storage means;
   (b) means for generating and storing at least one pattern, consisting of a set of asymmetric two dimensional waves identifying the at least one geometrical transformation, into the storage means; and
   (c) means for embedding said pattern of a set of asymmetric two dimensional waves identifying the at least one geometrical transformation which has been applied to the image in said stored image in a real domain.

2. The embedding system of claim 1, wherein said embedding system comprises a digital watermark embedding system and further comprises means for additionally embedding digital watermarks in said image that has said pattern embedded therein.

3. The system as set forth in claim 2 wherein said means for embedding said pattern is arranged to prevent degradation of image quality while embedding said pattern in the real domain.

4. The system as set forth in claim 1 wherein said means for embedding said pattern is arranged to prevent degradation of image quality while embedding said pattern in the real domain.

5. A position correcting pattern embedding system, comprising:
   (a) means for storing an image of an object into a storage means;
   (b) means for generating and storing at least one pattern, consisting of a set of asymmetric two dimensional waves representing correct positioning of said object, into the storage means;
   (c) means for embedding said pattern comprising a set of asymmetric two dimensional waves representing correct positioning of said object in said stored image in a real domain; and
   (d) means for embedding said image, which has said pattern embedded therein, in said object.

6. The system of claim 5 wherein said embedding said image comprises printing said image.

7. The system as set forth in claim 6 wherein said means for embedding said pattern is arranged to prevent degradation of image quality while embedding said pattern in the real domain.

8. The system as set forth in claim 5 wherein said means for embedding said pattern, is arranged to prevent degradation of image quality while embedding said pattern in the real domain.

9. A geometrical transformation identifying system for extracting two dimensional waves from an image that has said two dimensional waves embedded therein to identify at least one geometrical transformation which has been applied to the image, comprising:
   (a) means for identifying and extracting said two dimensional waves, identifying at least one geometrical transformation which has been applied to the image, embedded in said image that is stored in a storage means;
   (b) means for comparing predetermined asymmetric two dimensional waves with said extracted two dimensional waves; and
   (c) means, responsive to a result of said comparison, for calculating at least one of a plurality of linear coordinate transformations applied to the image, said plurality of linear coordinate transformations including a scaling factor, a rotational angle, an inversion, an anisotropic scaling factor, and a parallel translation's amount.

10. The system of claim 9 further comprising means for geometrically correcting said image by using said at least one calculated linear coordinate transformation.

11. The system of claim 10 further comprising means for extracting digital watermarks from said image that has been subjected to said geometrical correction.

12. The system of claim 9 further comprising means for performing position control of the object that has said image by using said at least one calculated linear coordinate transformation.

13. The system of claim 9 wherein said means for calculating at least one of a plurality of linear coordinate transformations is adapted to simultaneously calculate all of said plurality of linear coordinate transformations applied to said image.

14. A method of embedding two dimensional waves in an image for identifying at least one geometrical transformation which has been applied to the image, comprising the steps of:
   (a) storing the image into a storage means;
   (b) generating and storing at least one pattern, consisting of a set of asymmetric two dimensional waves identi fying said at least one geometrical transformation, into the storage means; and (c) embedding said generated pattern comprising a set of asymmetric two dimensional waves identifying said at least one geometrical transformation into said stored image in a real domain.

15. The method of claim 14 further comprising additionally embedding digital watermarks in said image that has said pattern embedded therein.

16. A method of extracting two dimensional waves from an image that has said two dimensional waves embedded therein to identify at least one geometrical transformation which has been applied to the image, comprising the steps of:

(a) identifying and extracting said two dimensional waves embedded in said image that is stored in a storage means said two dimensional waves identifying at least one geometrical transformation which has been applied to the image;

(b) comparing predetermined asymmetric two dimensional waves with said extracted two dimensional waves; and (c) responsive to a result of said comparison, calculating at least one of a plurality of linear coordinate transformations, said plurality of linear coordinate transformations including a scaling factor, a rotational angle, an inversion, an anisotropic scaling factor, and a parallel translation's amount, applied to the image.

17. The method of claim 16 further comprising the steps of:

(d) geometrically correcting said image by using said calculated linear coordinate transformation; and (e) extracting digital watermarks from said image that has been subject to said geometrical correction.

18. A medium for storing a program that is adapted for embedding two dimensional waves in an image to identify at least one geometrical transformation which has been applied to the image, wherein the program comprises:

(a) a function for storing the image into a storage means;

(b) a function for generating and storing at least one pattern, consisting of a set of asymmetric two dimensional waves, into the storage means; and (c) a function for embedding said pattern comprising a set of asymmetric two dimensional waves in said stored image in a real domain.

19. The medium of claim 18 wherein said program further comprises a function for additionally embedding digital watermarks in said image that has said pattern embedded therein.

20. A medium for storing a program that is adapted for extracting two dimensional waves from an image that has said two dimensional waves embedded therein to identify at least one geometrical transformation which has been applied to the image, wherein the program comprises:

(a) a function for identifying and extracting said two dimensional waves embedded in said image that is stored in a storage means, said two dimensional waves identifying at least one geometrical transformation which has been applied to the image;

(b) a function for comparing predetermined asymmetric two dimensional waves with said extracted two dimensional waves; and (c) a function, responsive to a result of said comparison, for calculating at least one of a plurality of linear coordinate transformation, said plurality including a scaling factor, a rotational angle, an inversion, an anisotropic scaling factor, and a parallel translation's amount, applied to the image.

21. The medium of claim 20 wherein the program further comprises:

(d) a function for geometrically correcting said image by using said calculated linear coordinate transformation; and (e) a function for extracting digital watermarks from said image that has been subjected to said geometrical correction.

* * * * *